United States Patent
Sikina et al.

(10) Patent No.: US 9,979,084 B2
(45) Date of Patent: May 22, 2018

(54) SATELLITE-BASED PHASED ARRAY CALIBRATION

(71) Applicant: Raytheon Company, Waltham, MA (US)

(72) Inventors: Thomas V. Sikina, Acton, MA (US); Jack J. Schuss, Newton, MA (US); Joseph C. Yeh, Brookline, MA (US); Patrick J. Makridakis, Mendon, MA (US)

(73) Assignee: Raytheon Company, Waltham, MA (US)

( * ) Notice: Subject to any disclaimer, the term of this patent is extended or adjusted under 35 U.S.C. 154(b) by 556 days.

(21) Appl. No.: 14/557,803

(22) Filed: Dec. 2, 2014

(65) Prior Publication Data

US 2016/0156100 A1 Jun. 2, 2016

(51) Int. Cl.
| | |
|---|---|
| *H01Q 3/26* | (2006.01) |
| *H01Q 1/28* | (2006.01) |
| *H04B 7/145* | (2006.01) |
| *H04B 17/12* | (2015.01) |
| *H04B 17/14* | (2015.01) |
| *H01Q 3/00* | (2006.01) |

(52) U.S. Cl.
CPC ............. *H01Q 3/267* (2013.01); *H01Q 1/288* (2013.01); *H04B 7/145* (2013.01); *H04B 17/12* (2015.01); *H04B 17/14* (2015.01)

(58) Field of Classification Search
CPC ............ H01Q 1/27; H01Q 1/28; H01Q 1/288; H01Q 3/26; H01Q 3/267; H01Q 3/22; H04B 7/14; H04B 7/145; H04B 17/10; H04B 17/11; H04B 17/12; H04B 17/14; H04B 7/15; H04B 7/185; H04B 7/1851; H04B 7/18519; G01S 7/02; G01S 7/40; G01S 7/4004; H04N 7/22
See application file for complete search history.

(56) References Cited

U.S. PATENT DOCUMENTS 5,455,592 A * 10/1995 Huddle .................. H01Q 3/267
342/174
5,559,519 A 9/1996 Fenner
(Continued)

FOREIGN PATENT DOCUMENTS

CN 103 471 563 12/2013
WO WO 2004/114547 A1 12/2004
(Continued)

OTHER PUBLICATIONS

Notification of Transmittal of the International Search Report and the Written Opinion of the International Searching Authority, or the Declaration, PCT/US2015/062928, dated Mar. 9, 2016, 12 pages.
(Continued)

*Primary Examiner* — Bernarr E Gregory
(74) *Attorney, Agent, or Firm* — Daly, Crowley, Mofford & Durkee, LLP

(57) ABSTRACT

Methods and apparatus to calibrate an array by sequentially calibrating elements in a subarray with respect to each other using a satellite. The satellite is repeatedly illuminated for calibrating the elements using reference elements to determine plane fronts from which active elements can be calibrated with respect to each other.

20 Claims, 20 Drawing Sheets

(56) References Cited

U.S. PATENT DOCUMENTS

| | | | | |
|---|---|---|---|---|
| 5,572,219 A * | 11/1996 | Silverstein | ............... | H01Q 3/22 |
| | | | | 342/165 |
| 5,677,696 A * | 10/1997 | Silverstein | ............. | H01Q 3/267 |
| | | | | 342/165 |
| 6,597,730 B1 * | 7/2003 | Bader | ...................... | H01Q 3/26 |
| | | | | 375/141 |
| 7,783,195 B2 * | 8/2010 | Riggsby | ................... | H04N 7/22 |
| | | | | 398/67 |
| 7,825,852 B2 * | 11/2010 | Wooldridge | ........... | H01Q 3/267 |
| | | | | 342/165 |
| 8,427,369 B1 * | 4/2013 | Freedman | .......... | H04B 7/18519 |
| | | | | 342/358 |
| 9,083,426 B1 * | 7/2015 | Freedman | .............. | H01Q 3/267 |
| 9,450,666 B1 * | 9/2016 | Freedman | .............. | H01Q 3/267 |
| 2006/0132357 A1 * | 6/2006 | Pozgay | ................. | G01S 7/4004 |
| | | | | 342/174 |

FOREIGN PATENT DOCUMENTS

| | | | | |
|---|---|---|---|---|
| WO | WO2005/086285 A1 * | 9/2005 | ............... | H01Q 3/26 |
| WO | WO 2005/086285 A1 | 9/2005 | | |
| WO | WO2010/136498 A1 * | 12/2010 | ............... | H01Q 3/26 |

OTHER PUBLICATIONS

International Preliminary Report on Patentability dated Jun. 6, 2017, for PCT/US2015/062928, 8 pages.

\* cited by examiner

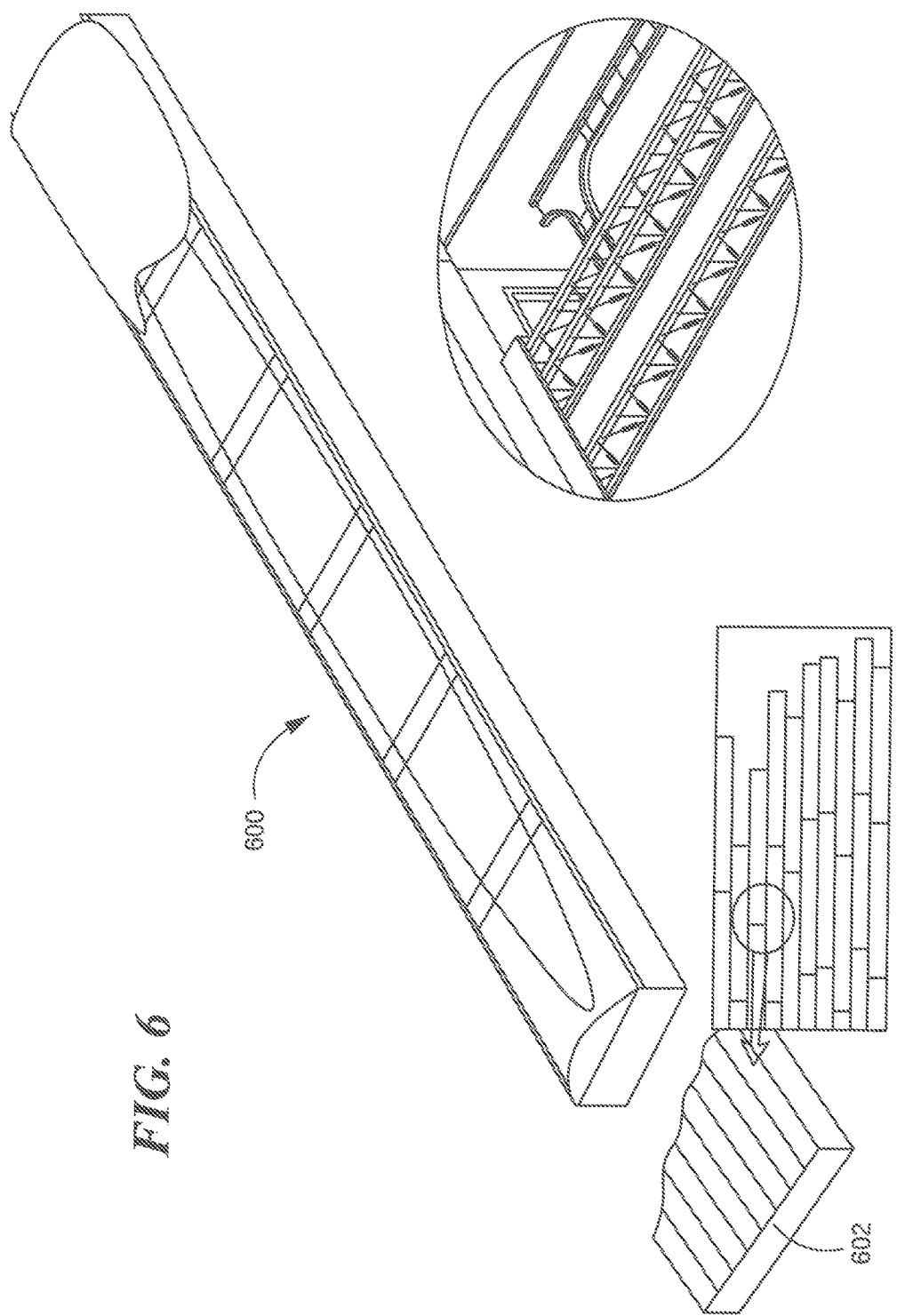

End View

Side View

SATELLITE-BASED PHASED ARRAY CALIBRATION

BACKGROUND

Phased array antennas in general must be calibrated at several levels in order to operate effectively. Since a phased array typically uses many active and passive components to form its aperture vector (amplitude and phase) state, these must be aligned in order to form a high efficiency radiation beam. While various conventional techniques are available to provide the initial calibration state, to correct for variability (recalibration), and to identify failed components for replacement, calibration often can be verified by or controlled through either near field or far field sensing methods. Very large microwave and RF phased array radars have apertures that can have lengths exceeding over 1000 wavelengths, for example, in any aperture dimension, making either near or far field sensing either expensive, very difficult, or both.

In one known technique, there is calibration of the individual components in the chain extending from the antenna beam port. After calibration in the factory, these components are assembled in the field to produce an initially calibrated aperture. However, this method of calibration has a number of drawbacks, including for example, heavy reliance on a bookkeeping system to catalogue the calibrated components in the beam formation chain, such that mistakes have the potential to produce an un-calibrated system. This is a concern with very large arrays requiring the calibration of greater than 10,000 independent paths in order to achieve array calibration. In addition, this method by itself does not verify the calibrated state, such that whenever a vector state error is produced, which can be due to assembly error, natural component degradation, or error, it cannot be directly detected by this method alone.

The above methods rely on near or far field sensors to detect the aperture vector state, both initially, and during the life of the antenna system. Large phased array planar systems impose significant problems for such calibration approaches because of the reliance on near or far field sensors. In the antenna near field, sensors may require large and accurate equipment to position a probe antenna in a plane near to and parallel with the fielded antenna aperture plane. The size and accuracy of such equipment can be significant cost factors. Beyond this, such a near field sensor may require considerable system downtime in order to determine the antenna aperture vector state, which is a prerequisite for calibration and recalibration. Far field calibration sensors alone are a complex and expensive approach for large array calibration because of the significant separation distances involved.

The calibration methods typically used for phased arrays are clearly disadvantageous for large apertures. In addition, however, a considerable challenge comes in the form of a digital beam forming system. As a result, additional microwave connectivity is needed to calibrate the digital channels. Without such calibration, these digital networks may drift, and as a result, produce array and system losses and errors that can degrade the system performance and capabilities.

It will be appreciated that various known RF injection techniques have been used in moderately-sized phased array antennas. These include beacon methods, such as the use of aperture peripheral horn antennas, or near field antennas, or the use of array radiating element mutual coupling. However, these methods have significant disadvantages when considered for large phased arrays. For example, the beacon methods require a source antenna in the large array near field, thus causing difficulties in providing physical support while remaining outside of the large array field of view, source physical stability, and limitations on the large array aperture field variation, particularly when frequency scanned elements are used. Mutual coupling methods are also limited when these elements are used, largely because inter-element coupling magnitude may be insufficient for accurate calibration.

SUMMARY

Embodiments of the invention provide element level calibration and subarray level calibration using a satellite having a known position. Subarray level calibration can be accomplished, for a given frequency, with one radar pulse. Element level calibration requires approximately twenty pulses for an example of a ten element subarray, as each pulse calibrates a single element within each subarray. This sequence is repeated to calibrate the reference subarrays, as will be described below, resulting in a total of twenty pulses. Once all elements within all subarrays are calibrated, the reference elements can then be calibrated. In one embodiment, about sixteen pulses are needed for an 8-element sized subarray.

Embodiments of the invention provide satellite-based phased array calibration by aligning a system subarray amplitude and phase state to a known standard using existing satellite resources. Embodiments of the invention can meet accuracy requirements for array calibration at a relatively low cost using the transmit-receive array system and tracked high Radar Cross-Section (RCS) satellites.

In general, satellite-based calibration uses a system under test to transmit a sometimes crudely formed beam towards a known high RCS satellite having an orbit position within the system field of view. The backscattered waves from the satellite illuminate the same system in receive mode. The satellite projects a known amplitude and phase distribution on the system aperture. Once this known distribution is de-embedded, the residual measurement at either the element level or the subarray level represents the residual subarray amplitude and phase errors, which can be converted into calibration coefficients, by taking their complex reciprocal. Multiple satellite tests may be needed in order to improve the calibration accuracy, due to signal to noise level errors or multipath errors.

It should be noted that one aspect is directed to calibrating phased arrays at the element level and another aspect is directed to calibration at the subarray level. In modern phased arrays, where several elements are combined into each subarray, and where each subarray has a separate DREX receive channel that feeds into a digital beamformer (DBF), calibration of all subarrays relative to each other only requires one radar pulse at a given frequency. This is because each subarray's receive signal vector from the satellite is measured and recorded by the radar processor at every pulse. Therefore, for any single pulse, the relative phase and amplitude of each subarray relative to the other subarrays is measured. By comparing this subarray phase and amplitude to what is expected, taking into account the satellite ephemeris, a subarray level calibration is accomplished. This procedure can be repeated for several satellite passes at different view angles in order to reduce errors due to finite signal to noise ratios or due to multipath.

To calibrate at the element level, the satellite is used in related but modified way. In an embodiment, the elements in each subarray are turned off except for one. Each DREX channel now measures the vector response of the single element that is turned on in that subarray. A single pulse is then received by the array, and the response of the elements that are turned on is measured. This pulse detection process is repeated several times, and for each pulse a different element in each subarray is turned on. This is repeated until the elements in each subarray are calibrated with respect to teach other.

In order to accomplish this element level calibration, a set of reference elements are set aside that are used to measure the change in insertion phase and phase slope from pulse to pulse. This is necessary because the satellite is moving, which changes the distance (phase) and angle (phase slope) of the satellite pulse to pulse. Once this change is measured, the measured insertion phases of the elements and their amplitude gains are adjusted to compensate for the satellite motion, and any amplitude fluctuation in the satellite reflected pulse. Note that for a spherical calibration satellite, this latter amplitude fluctuation is largely absent. When this procedure is complete, the reference elements, and optionally the elements in the reference element subarrays, are calibrated using the remainder of the array as new reference elements. If each subarray has N elements, this process then requires 2N pulses at each frequency. Again, this procedure can be repeated for several satellite passes at different view angles in order to reduce errors due to finite signal to noise ratios or due to multipath.

With this arrangement, the need for array production factory calibration in a near field facility is eliminated. Subarray calibration can occur in a factory setting using a single horn source in a small anechoic environment, for example. Subarray calibration can be used in element-level calibration as part of satellite-based calibration.

In one aspect of the invention, a method for subarray element level calibration, comprises: illuminating a satellite having a known position at a first time; receiving signal return from the satellite at an array having subarrays, wherein a first one of elements in respective subarrays are active; computing a first plane front for the signal return associated with the first time; illuminating the satellite at a second time; receiving signal return associated with the second time from the satellite, wherein a second one of elements in the respective arrays are active; computing a second plane front for the signal return associated with the second time; compensating for movement of the satellite between the first and second times; calibrating the first ones of elements in relation to the second ones of elements using the first and second plane fronts; and repeating until elements in the subarrays are calibrated with respect to each other.

The method can further include one or more of the following features: measuring change in insertion phase and phase slope for the signal returns for the first and second times, adjusting amplitude gain to compensate for the satellite movement, using a second satellite for calibration for the subarray element calibration, verifying the calibration using a Fourier Gauge system, at least one of the subarrays includes eight elements, using a set of reference elements in reference subarrays to measure changes in insertion phase and phase slope from pulse to pulse, and/or calibrating elements in the set of reference elements. It is understood that any practical 1 to N elements per subarray configuration can be used.

In another aspect of the invention, an article comprises: a non-transitory storage medium having stored instructions that enable a machine to perform subarray element level calibration, the instructions to: illuminate a satellite having a known position at a first time; receive signal return from the satellite at an array having subarrays, wherein a first one of elements in respective subarrays are active; compute a first plane front for the signal return associated with the first time; illuminate the satellite at a second time; receive signal return associated with the second time from the satellite, wherein a second one of elements in the respective arrays are active; compute a second plane front for the signal return associated with the second time; compensate for movement of the satellite between the first and second times; calibrate the first ones of elements in relation to the second ones of elements using the first and second plane fronts; and repeat until elements in the subarrays are calibrated with respect to each other.

The article can further include instructions for one or more of the following features: measuring change in insertion phase and phase slope for the signal returns for the first and second times, adjusting amplitude gain to compensate for the satellite movement, using a second satellite for calibration for the subarray element calibration, verifying the calibration using a Fourier Gauge system, at least one of the subarrays includes eight elements, using a set of reference elements in reference subarrays to measure changes in insertion phase and phase slope from pulse to pulse, and/or calibrating elements in the set of reference elements.

In a further aspect of the invention, a method for subarray level calibration comprises: illuminating a satellite having a known position at a first time; receiving signal return from the satellite at an array having subarrays, wherein selected ones of the subarrays are active as reference elements; measuring the signal return at the reference elements; computing a first plane front for the signal return associated with the first time; comparing the first plane front to an expected plane front based on the known satellite position; and computing calibration at the subarray level from the comparing of the first plane front to the expected plane front.

The method can further include one or more of the following features: using a second satellite for further calibration at the subarray level and/or achieving at least six degree, 1.0 dB rms calibration accuracy in a single pass of the satellite.

In a further aspect of the invention, an article comprises: a non-transitory storage medium having stored instructions that enable a machine to perform subarray calibration, the instructions to: illuminate a satellite having a known position at a first time; receiving signal return from the satellite at an array having subarrays, wherein selected ones of the subarrays are active as reference elements; measure the signal return at the reference elements; compute a first plane front for the signal return associated with the first time; compare the first plane front to an expected plane front based on the known satellite position; and compute calibration at the subarray level from the comparing of the first plane front to the expected plane front.

BRIEF DESCRIPTION OF THE DRAWINGS

The foregoing features of this invention, as well as the invention itself, may be more fully understood from the following description of the drawings in which:

FIG. 6 is a pictorial representation of a super-element forming a part of an antenna aperture;

DETAILED DESCRIPTION

Figure 1:
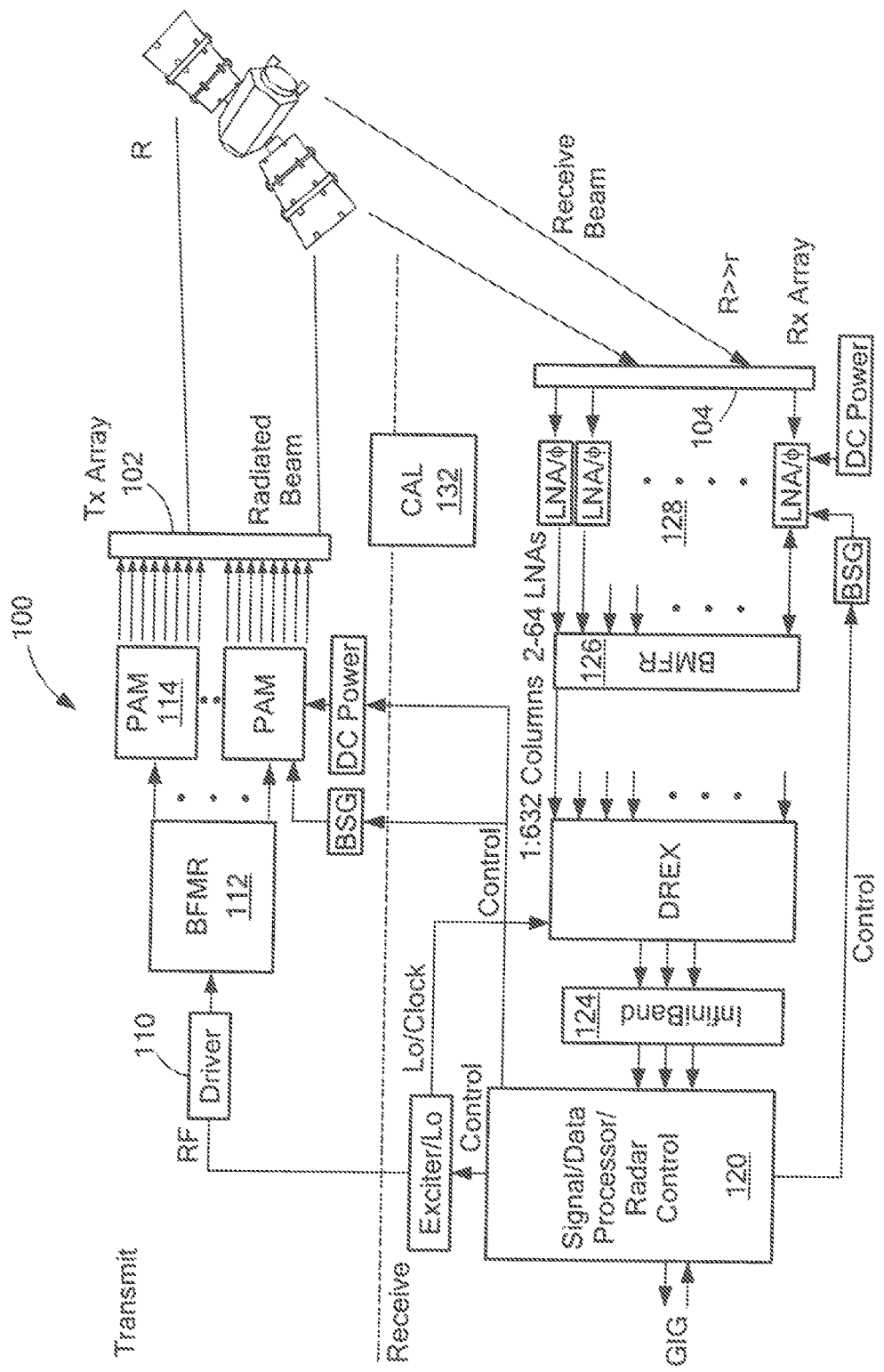
FIG. 1 is a schematic representation of a phased array radar system having satellite-based calibration capability in accordance with exemplary embodiments of the invention.

FIG. 1 shows an exemplary phased array radar system 100 having satellite-based calibration in accordance with illustrative embodiments of the present invention. The phased array radar 100 has separate transmit and receive arrays 102, 104 with a transmit side driver 110 coupled to a digital beamformer 112 feeding a PAM (Power Amplifier Module) 114, which energize the transmit array 102. The receive side includes a signal data processor control module 120 coupled to a digital receive system 122 via a universal I/O device 124, such as InfiniBand. The receive beamformer 126 receives input from the low noise amplifiers 128, which are coupled to the receive array 104. The system 100 includes a calibration module 132 to control and process calibration information in accordance with exemplary embodiments of the invention.

In an exemplary embodiment, the transmit aperture 102 and separate receive aperture 104 are sized to enable the radar system to track targets from 100 km to 42,000 km in altitude. In one particular embodiment, the system includes a transmit aperture of about 200 m by 14 m and a receive aperture of about 215 m by 27 m, both of which can be elliptical. An exemplary operating frequency ranges from about 3 GHz to about 4 GHz. The challenges associated with calibrating arrays of this size will be readily apparent to one of ordinary skill in the art.

Figure 2:
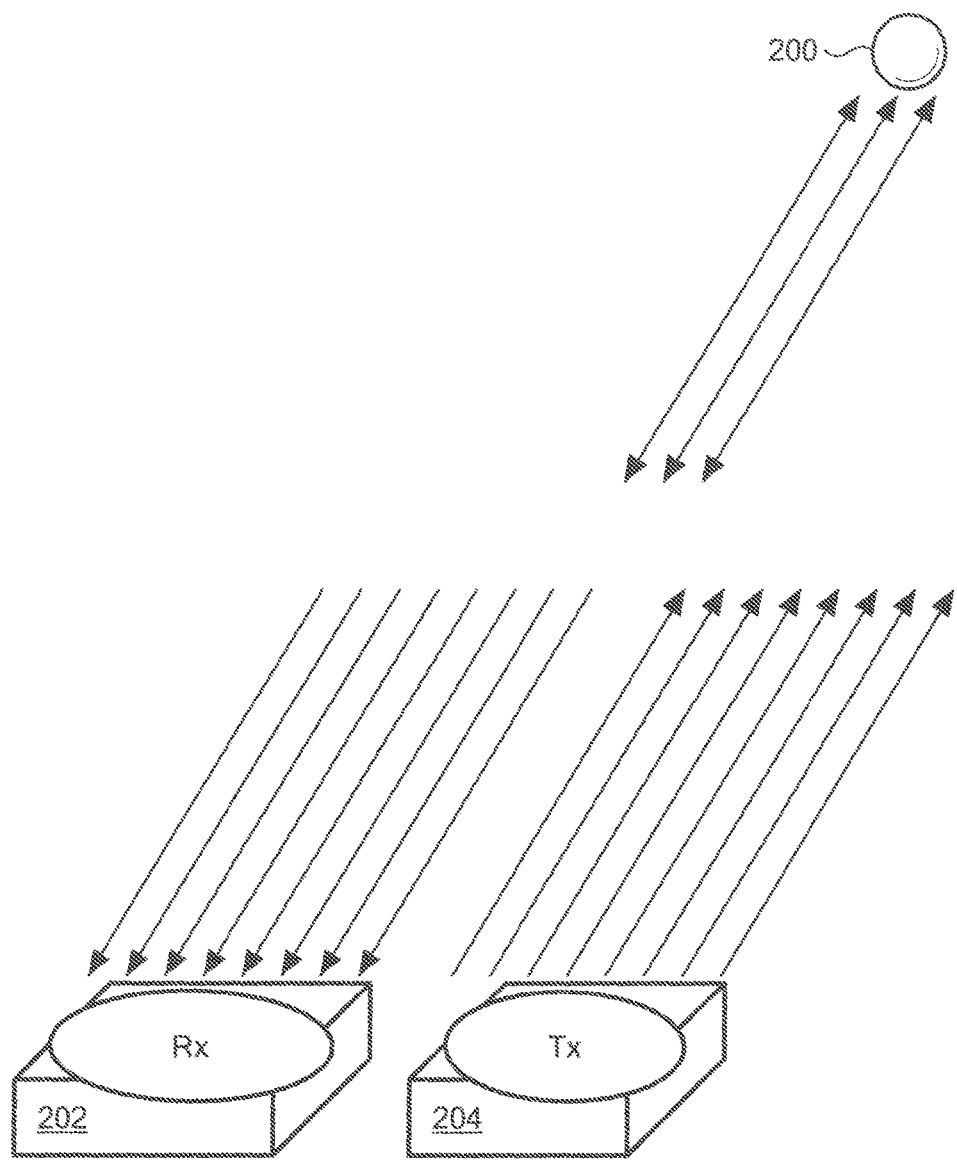
FIG. 2 is a schematic representation of a plane front for return from a satellite.

As shown in FIG. 2, the system illuminates a known satellite 200 and the receive array 202 receives the reflected plane wave, which is used as a calibration reference field to provide subarray and/or element-level calibration. The transmit array 204 is directed at the calibration satellite 200 and its reflected pulse is received by the receive array. Accuracy requirements can be readily achieved at the transmit array subarray and element levels in order to adequately illuminate the satellite, thereby resulting in a reflected pulse at the receive array of sufficient magnitude to result in signal to noise ratios (SNR) greater than 20 dB. Note that this works equally well for separate receive and transmit arrays, and for a combined transmit/receive array in a single mechanical structure. It is understood that computing a plane wave from signal return is well known in the art. For multiple satellites or passes of the same satellite, a best fit for the plane can be computed.

Figure 2A:
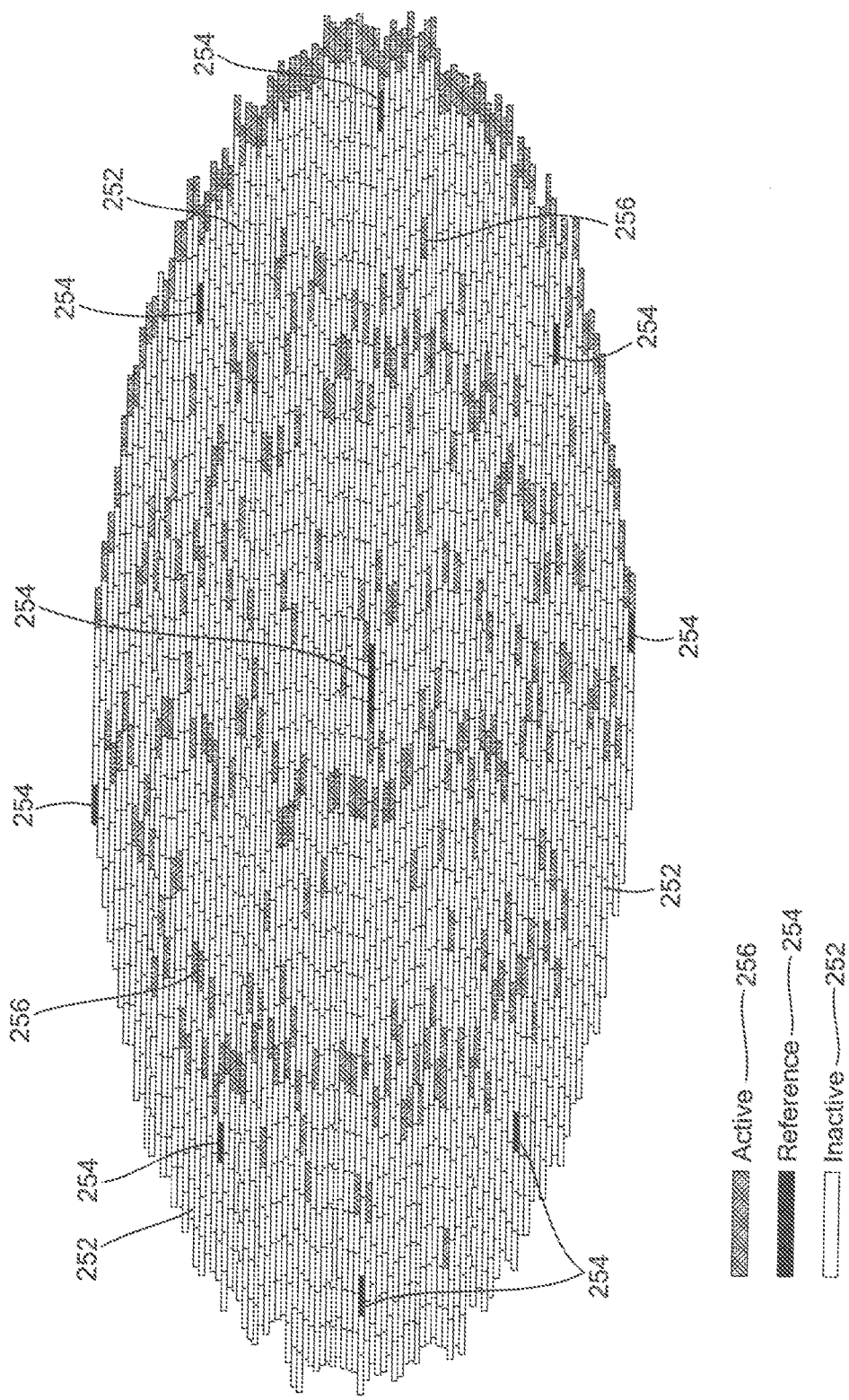
FIG. 2A is a schematic representation of an array including subarrays having a number elements, where elements can be reference elements, active elements, or inactive elements during the calibration process.

FIG. 2A shows further detail of an array 250 showing selected activation of test and reference elements, e.g., super-elements. During calibration at a given time, there are inactive elements 252, reference elements 254, and active elements 256. By selectively activating test and reference elements, a desired calibration accuracy can be achieved with respect to satellite motion and aperture size.

In one aspect, calibration is performed at the subarray level. A number of elements are combined into each subarray with each subarray having a separate Digital Receive/Exciter (DREX) channel that feeds into a digital beamformer (DBF). The subarrays can be calibrated relative to each other with only one radar pulse at a given frequency. This is because each subarray's receive signal vector from the satellite is measured and recorded by the radar processor at every pulse. Therefore, for any single pulse, the relative phase and amplitude of each subarray relative to the other subarrays is measured. By comparing this subarray phase and amplitude to what is expected, taking into account the satellite ephemeris, a subarray level calibration is accomplished. This procedure can be repeated for several satellite passes at different view angles in order to reduce errors due to finite signal to noise ratios or due to multipath.

To calibrate at the element level, the satellite is used in related but modified way. In an embodiment, the elements in each subarray are turned off except for one. Each DREX channel now measures the vector response of the single element that is turned on in that subarray. A single pulse is then received by the array, and the response of the elements that are turned on is measured. This pulse is repeated several times, and for each pulse a different element in each subarray is turned on. This is repeated until the elements in each subarray are calibrated.

In order to accomplish this element level calibration, a set of reference elements 254 are set aside, which are used to measure the change in insertion phase and phase slope from pulse to pulse. This is necessary because the satellite is moving, which changes the distance (phase) and angle (phase slope) of the satellite pulse to pulse. Once this change is measured, the measured insertion phases of the elements are adjusted to compensate for the satellite motion. Also, the change in the amplitude response of the reference elements is measured and averaged over the reference elements. This average amplitude change is use to adjust the amplitude of the signal measured by each element being calibrated, to compensate for pulse to pulse changes in the amplitude of the signal reflected from the calibration satellite. When this procedure is complete, the reference elements 254, and optionally the elements in the reference element subarrays, are calibrated using the remainder of the array as new reference elements. If each subarray has N elements, this process then requires 2N pulses at each frequency. This procedure can be repeated for several satellite passes at different view angles in order to reduce errors due to finite signal to noise ratios or due to multipath.

A desired number of reference elements 254 are used for a satellite source in its far-field. Consider two reference elements 254 at a separation of d, representing the aperture size in one plane. These elements 254 have positions within the array that are known to an accuracy better than $0.01\lambda$, or about one part in one hundred wavelengths, for example. The phase error introduced by this locational precision is equal to kl, where k is the propagation constant in free space, or $2\pi/\lambda$, l is the positional uncertainty. The phase error ($\varphi$) is therefore $0.02\pi$. When there are N reference elements, the error is reduced by its square root, since these errors are stochastic. For N=100, the error becomes kl/10 or $0.002\pi$. Errors from other sources, such as signal to noise or multipath, similarly scale as the square root of N. Typical phased array systems need phase accuracies stemming from calibration error sources of about $0.05\pi$, so the error for the calibration technique described above is about four percent of the maximum allowed.

Embodiments of the invention provide element-to-element calibration where subarrays comprise a number of elements. In one embodiment, subarrays include eight elements. It is understood that subarrays can include any practical number of elements.

When a satellite is within the system field of view with a known position, at least one element transmits a pulse to illuminate the satellite. Reference elements 254 receive return that is used to compute a plane wave that can be used as reference. The active elements 256 in the subarrays, one per subarray, for example, can receive return from the transmit pulse for processing to calibrate the active elements. There are now seven elements in the subarray remaining to be calibrated.

Where the same satellite is used, a next transit pulse illuminates the satellite, which has now moved. For example, for a satellite moving at about 7 km/s, with a 5 ms gap between transmit pulses, the satellite moves about 35 m in the gap, which may result in a significant phase change. In this case, for a satellite orbiting at an altitude of 800 km, the angular change of the position of the satellite pulse to pulse would be 35 m/800 km or approximately 44 microradians; for an S-Band array operating between 3 GHz and 4 GHz, the resulting end to end phase slope error due to this motion for a 100 m long array would be $0.1\pi$. This level of phase error must be corrected to obtain an accurate calibration. The reference elements 254 are used to compute a new phase front for the signal return. New active elements 256 in the respective subarrays can be calibrated in relation to the first group of active elements. The remaining ones of the uncalibrated elements in the subarrays are then calibrated sequentially until the elements in the subarrays are calibrated using the computed plane fronts from the reference elements each time the satellite is illuminated.

In one embodiment, the reference elements 254 can then be calibrated in relation to the elements in the subarrays. For example, if twenty reference elements are used, these twenty can be calibrated after the elements in the subarrays have been calibrated.

The process can be repeated a number of times with the same or different satellites to average out errors, such as those from local sources and reflections.

Figure 3:
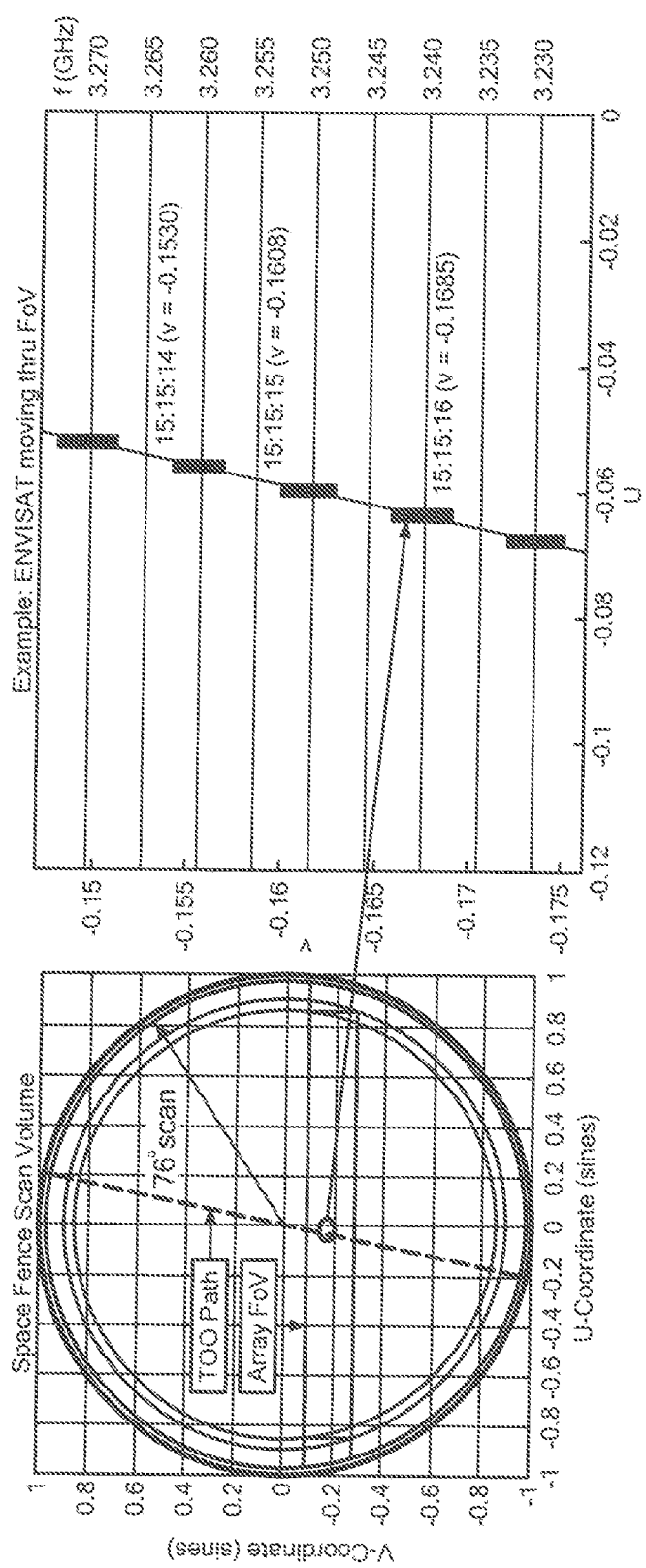
FIG. 3 is a schematic and graphical representation of a satellite moving through the field of view (FoV) of the system in u and v space, where u is defined as $\cos \alpha$, where $\alpha$ is the angle between the satellite direction and the array x axis; v is defined as $\cos \beta$, where $\beta$ is the angle between the satellite direction and the array y axis, where for a satellite in the boresight direction, namely in a direction directly perpendicular to the array face, $\alpha=\beta=90°$, and $u=v=0$.

FIG. 3 shows an illustrative graphical representation of a satellite, shown as ENVISTAT, of known coordinates passing within the receive array field of view Array FoV along a known path TOO Path. The receive array receives the backscattered fields and records this information for u (sines) and v (sines) coordinates at selected frequencies, shown as 3.27 to 3.23 GHz in this case. In embodiments, elements within a subarray are sequenced one at a time. Reference elements detect the satellite motion during sequential calibration and the satellite field distribution is de-embedded from the results to yields the receive array aperture distribution relative to a uniform plane wave standard. Calibration coefficients are derived by taking the complex reciprocal. It is understood that multiple satellite calibration measurements increase the calibration accuracy, due to reductions in errors caused by finite signal to noise ratios or multipath.

Figure 4A:
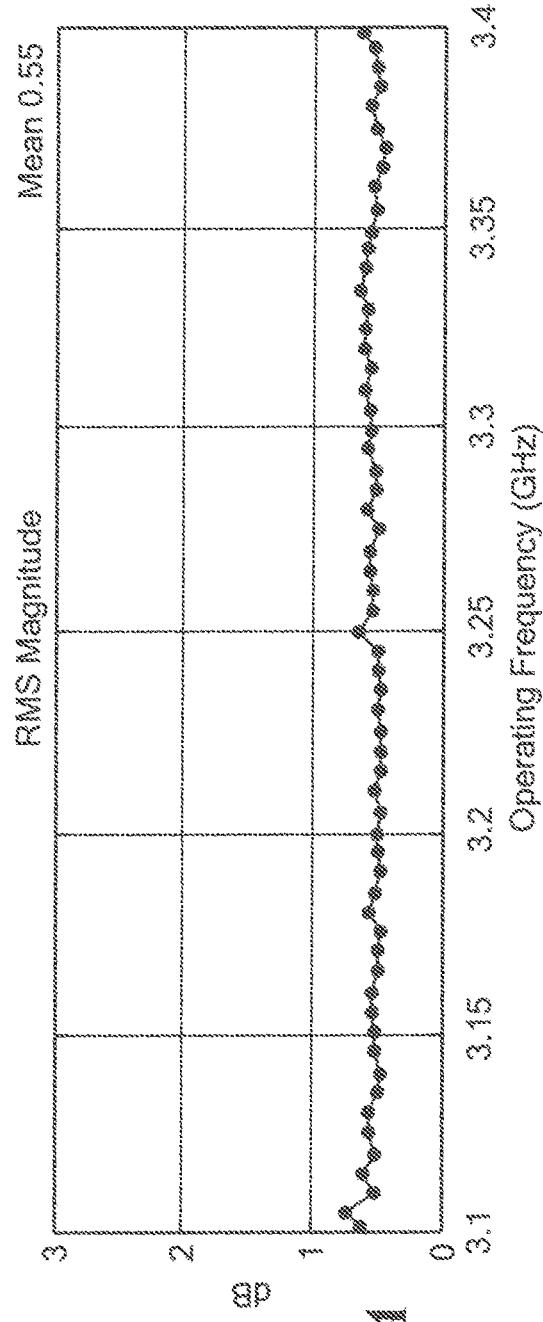
FIGS. 4a and 4b show plots of subarray level rms magnitude and phase errors for satellite calibration vs. frequency.
Figure 4B:
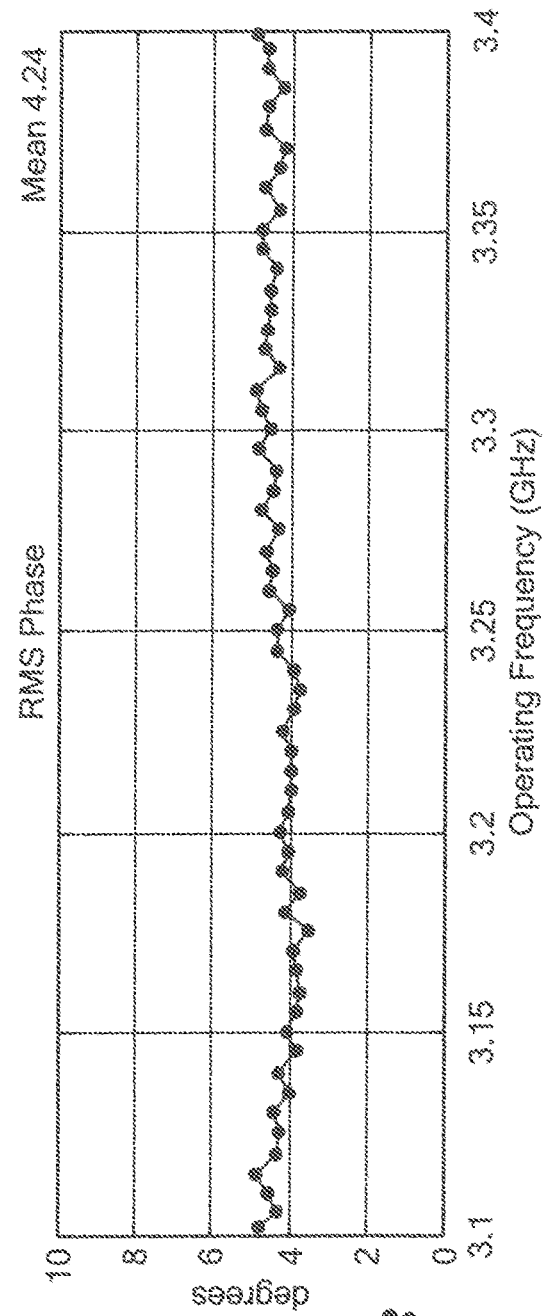

FIGS. 4a and 4b show a graphical representations of RMS magnitude and phase deviations over subarrays vs. frequency of a receive aperture having 32 subarrays and calibrated at sixty frequencies. In this case, the data was taken for a 256 super-element array, that has its super-elements arranged in a 16 element by 16 element lattice that has approximate dimensions of 0.68 m by 51 m. Each subarray comprises 8 super-elements, and has a width of approximately 0.047 m and a length of approximately 25.6 m. The individual super-elements are shown in FIGS. 6-9 and described below. FIGS. 4a, 4b compare an independent Mobile Fourier gauge (MFG) calibration for the array (see FIG. 11A-12D) against satellite calibration. The average error between the MFG and SatCal methods is 0.55 dB and 4.24° rms, and when equally allocated to the MFG and SatCal implies a compliant calibration error for each of 0.39 dB, 3.0° rms versus the requirements of 0.9 dB, 6.2° for this particular array. This data is taken over operating frequencies that range from 3.1 GHz to 3.4 GHz.

Figure 4C:
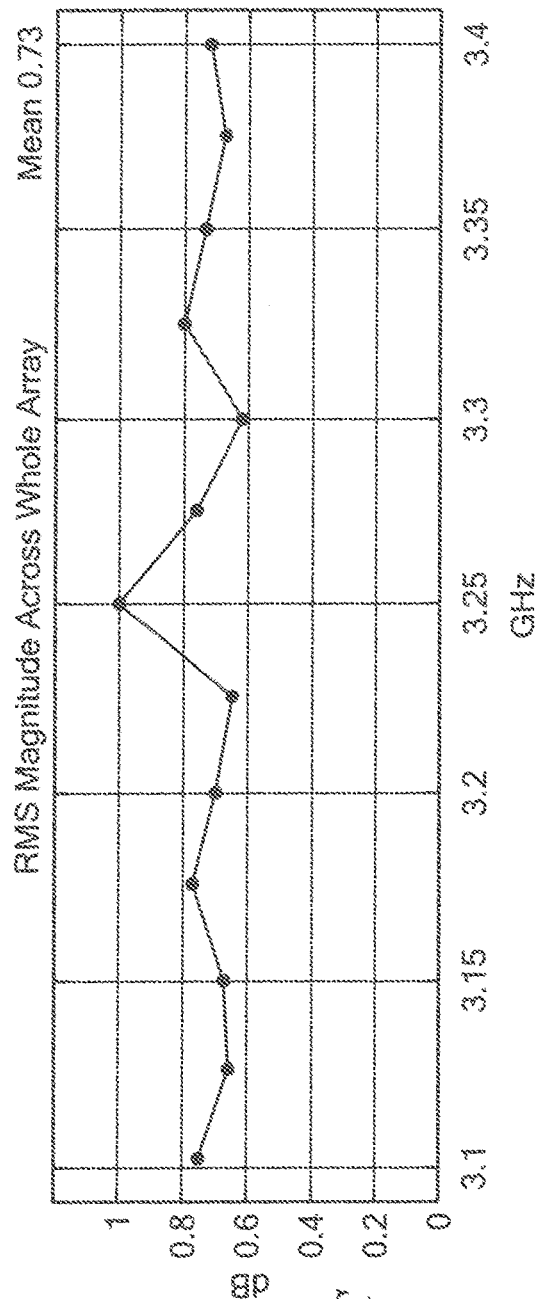
FIGS. 4c and 4d show plots of plots of element level rms magnitude and phase errors for satellite calibration vs. frequency.
Figure 4D:
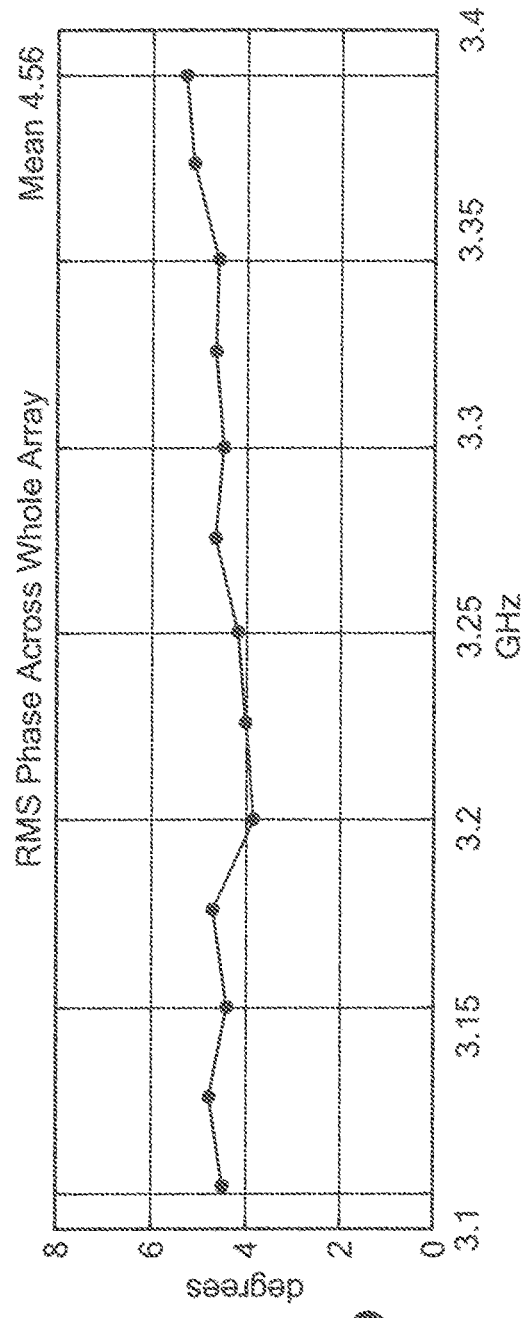
Figure 5A:
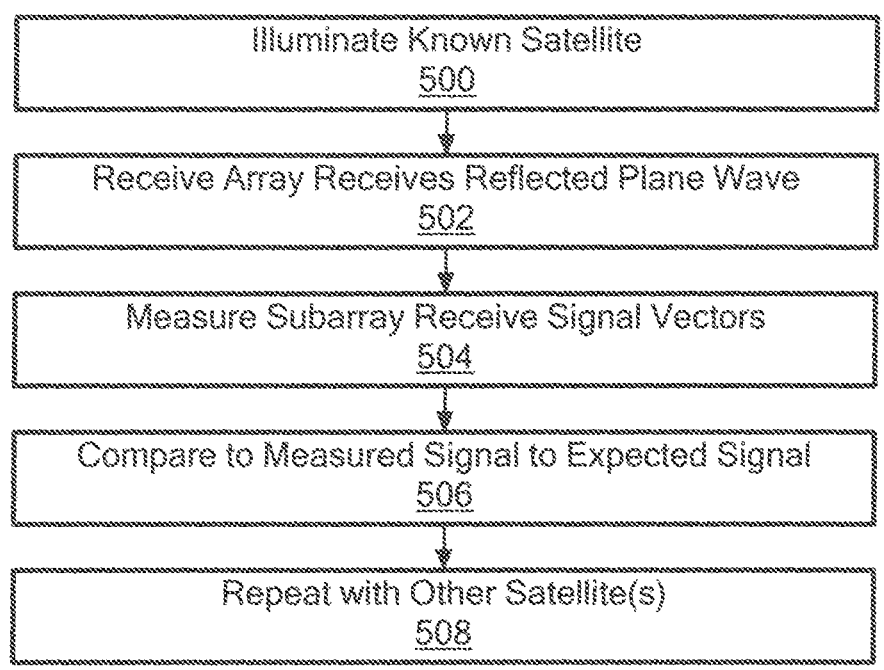
FIG. 5A is a flow diagram showing an illustrative sequence of steps for subarray level calibration using a satellite.

FIGS. 4c and 4d show the resulting phase and amplitude rms errors of this array at the element level, where calibration was carried out on this same array using the element level calibration procedure outlined above. As can be seen, the average error between the MFG and SatCal methods is 0.73 dB and 4.56° rms. When these errors are equally allocated to the MFG and SatCal, they imply a compliant calibration error for each of 0.52 dB, 3.2° rms versus the requirements of 0.9 dB, 6.2° for this particular array FIG. 5A shows an illustrative sequence of steps for providing satellite-based phased array calibration at the subarray level. In step 500, a satellite having a known trajectory is illuminated with a pulse using a transmit array of a phased array radar system. In step 502, a receive array of the system receives a reflected plane wave from the satellite. In step 504, the subarray receive signal vector from the satellite is measured and recorded by the radar processor so that the relative phase and amplitude of each subarray relative to the other subarrays can be measured. In step 506, the subarray phase and amplitude is compared to what is expected, taking into account the satellite ephemeris, so that subarray level calibration is achieved. In step 508, the process is optionally repeated for a number of satellite passes at different view angles in order to reduce errors due to finite signal to noise ratios or due to multipath.

Figure 5B:
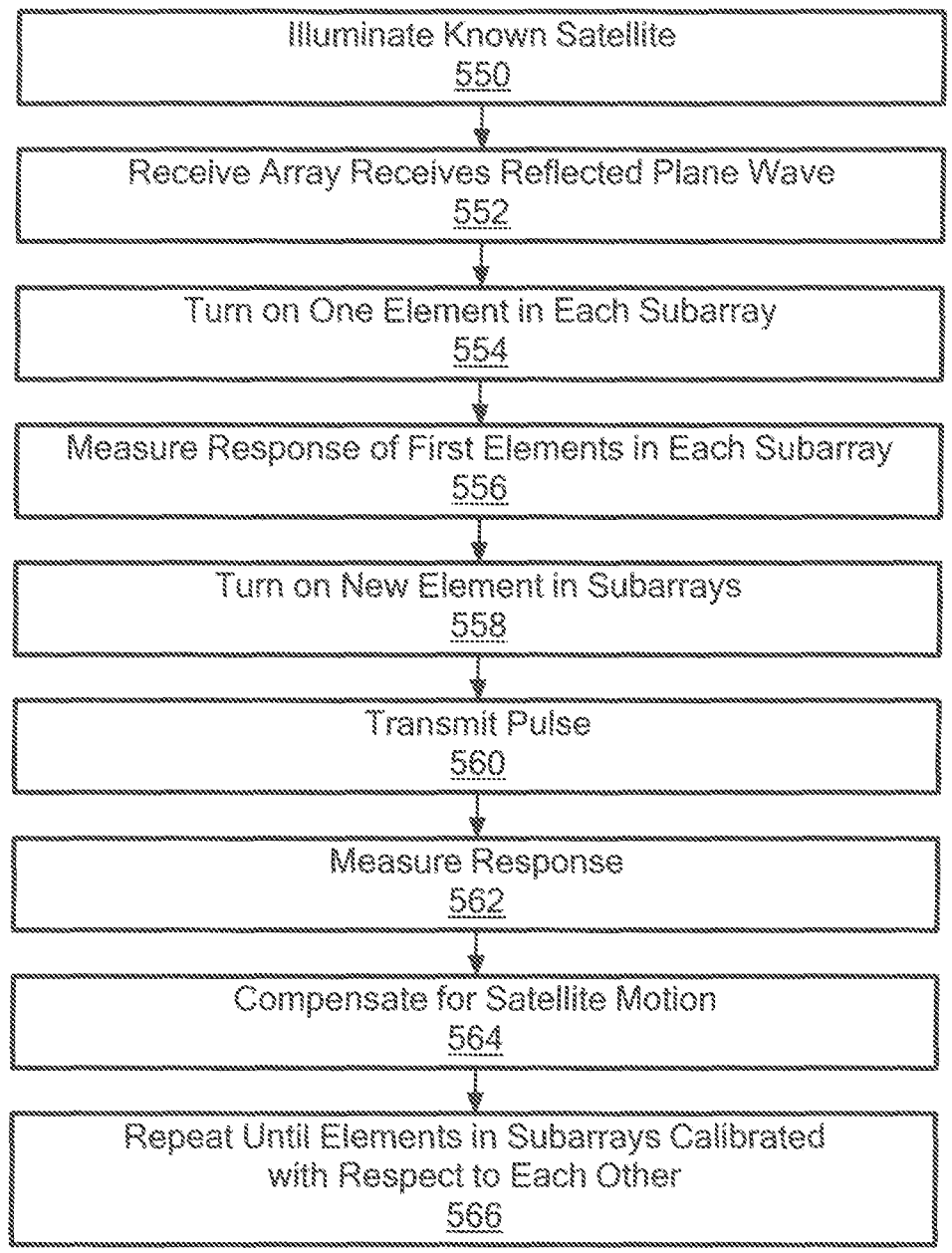
FIG. 5B is a flow diagram showing an illustrative sequence of steps for subarray element level calibration using a satellite.

FIG. 5B shows an illustrative sequence of steps for providing satellite-based phased array calibration at the subarray element level. In step 550, a satellite having a known trajectory is illuminated with a pulse using a transmit array of a phased array radar system. In step 552, a receive array of the system receives a reflected plane wave from the satellite. In step 554, the elements in each subarray (before pulse return) are turned off except for one. In step 556, each DREX channel measures the vector response of the single element that is turned on in that subarray. The pulse is received by the array, and the response of the elements that are turned on is measured. In step 558, the active element is turned off and a different element in the subarray is turned on. In step 560, another pulse is transmitted and in step 562 the response is measured. In general, a set of reference elements are set aside for element level calibration to measure the change in insertion phase and phase slope from pulse to pulse. This is necessary because the satellite is moving, which changes the distance (phase) and angle (phase slope) of the satellite pulse to pulse. Once this change is measured, the measured insertion phases of the elements are adjusted to compensate for the satellite motion in step 564. In step 566, the process is repeated until each element in the subarray has become active for a pulse. When this procedure is complete, the reference elements, and optionally the elements in the reference element subarrays, are calibrated using the remainder of the array as new reference elements. If each subarray has N elements, this process then requires 2N pulses at each frequency.

It is understood that elements in the subarray can comprises any suitable element or super-element. A super-element comprises a number of individual radiator elements coupled to a common transmission line. This can be realized in a number of topologies, including configurations of waveguides with slot radiators, configurations of radiators fed by stripline feeds, and configurations of oversized ($>\lambda/2$) waveguide radiators. Generally, the scan volume associated with super-element radiators is limited to a relatively narrow scan range located near the aperture surface normal or boresight.

FIG. 6 shows an array implementation using a super-element radiator. An array 600 includes a number of super-element radiators 602 having a number of radiator elements. In one embodiment, the array uses a frequency-scanned super-element approach with a matched resonance design and a zero cutoff frequency or traveling wave aperture spatial interface to a series ridged waveguide feed network.

Figure 7:
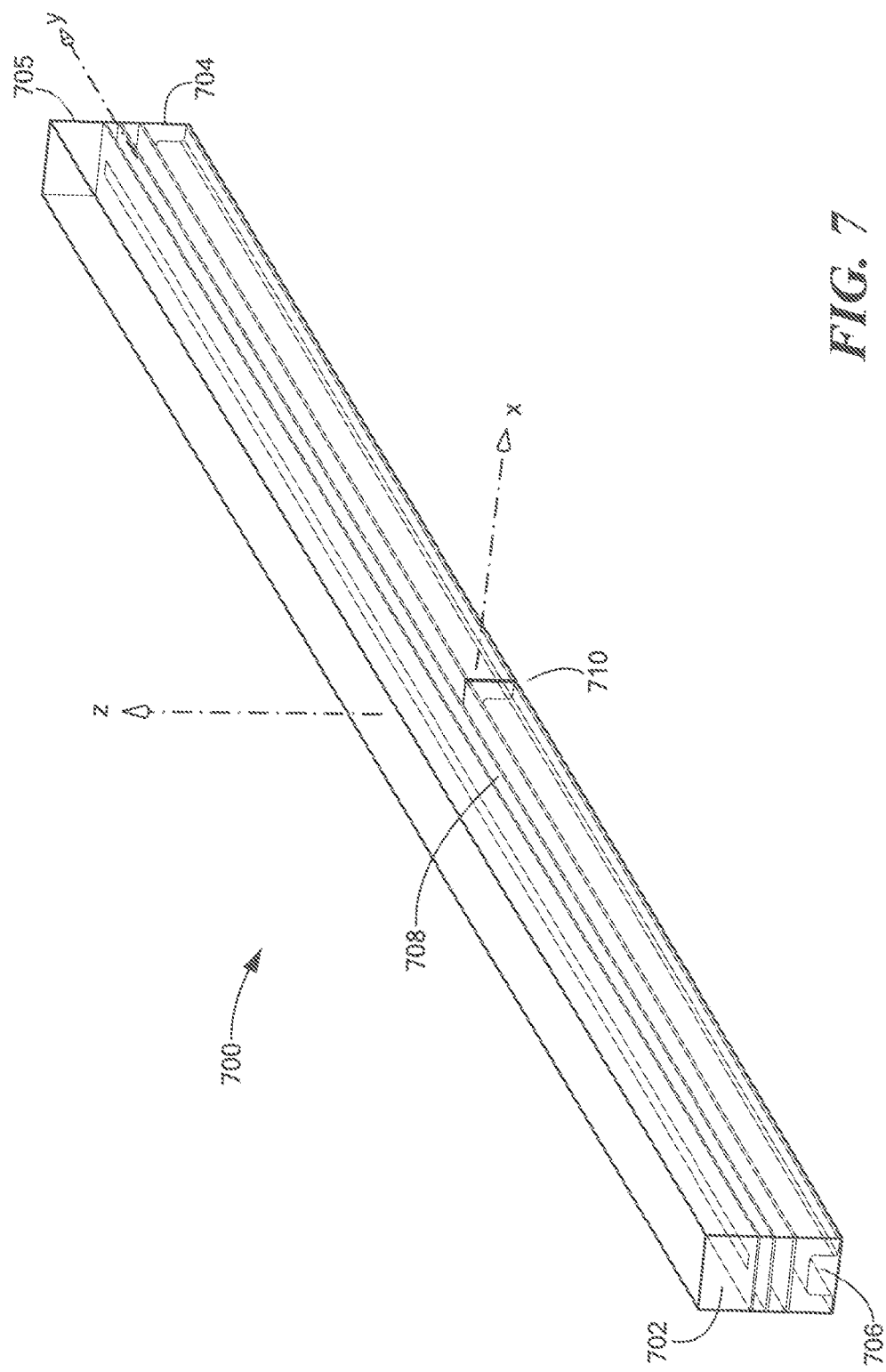
FIG. 7 is a diagrammatic representation of a super-element.
Figure 8:
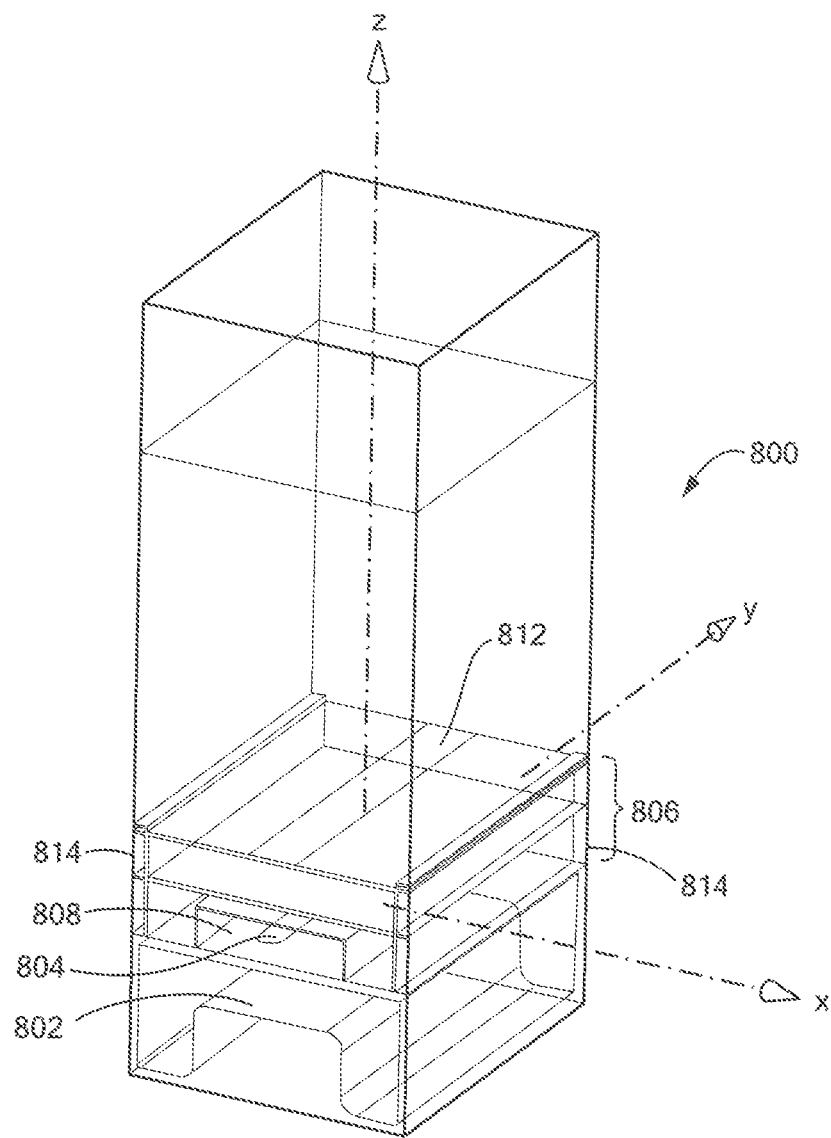
FIG. 8 is a depiction in model form of a unit cell of a super-element.

FIG. 7 shows an exemplary super-element radiator 700 and FIG. 8 shows a unit cell 800 in the super-element. The super-element 700 includes an input port 702 and a termination port 704. Simulated radiation boundaries 705 are disposed in the xz plane above a ridged waveguide 706 that extends along an axis of the super-element. Simulated master/slave walls 708 are located on the sides in yz plane above the waveguide 706. Note that a split 710 in the waveguide is shown for modeling purposes to help the meshing process.

FIG. 8 shows some further detail for a unit cell 800 of the radiator. The unit cell includes a single ridge waveguide 802, which is well known in the art. With a feed port at one end of the super-element and a termination at the other end, the super-element acts as a transmission line distributing electromagnetic power to each of the unit cells. The upper conductive wall of the waveguide is interrupted with a slot coupler 804 (see FIG. 6A). A dielectric assembly 806 is disposed over the waveguide 802. In an exemplary embodiment, the dielectric assembly includes a channel 808 and a layer stack shown in detail in FIG. 9A, 9B, which shows exemplary dimensions for the unit cell 800. The dielectric assembly includes first and second conductive strips or patches 810, 812 located at first and second heights above the coupling slot 804. The resonant conductive strips 810, 812 are suspended with low loss foam dielectric materials in a single sub-assembly. In an exemplary embodiment, the strips 810, 812 are continuous over the full length of the super-element. Conductive walls 814 enclose the dielectric and strip subassembly, also running the full length of the super-element. The conductive walls 814 form a long slot radiator, with an opening extending the full length of the super-element. As shown in FIG. 9B, the coupler 804 is approximately 1.52 inches long, 0.15 inches wide, with semi-circular ends, and is cut out of the full height of the upper waveguide wall.

Figure 9A:
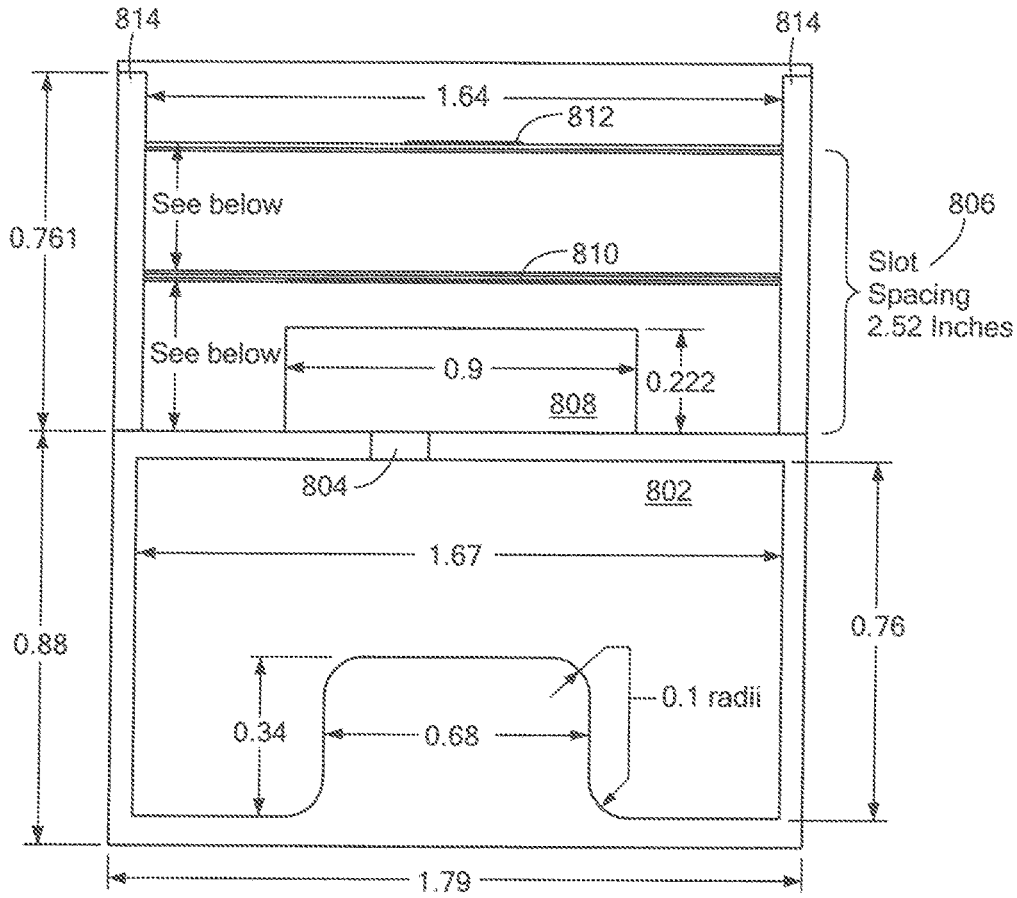
FIG. 9A is a cross-sectional view of a super-element and FIG. 9B is a top view of a portion of a super-element.
Figure 9B:
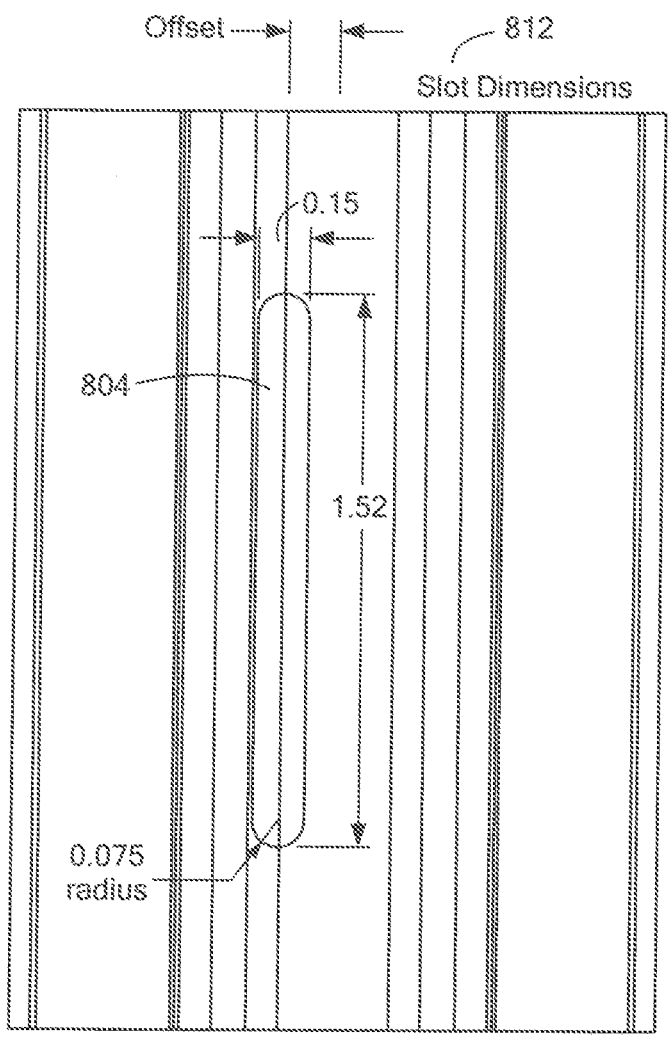

As shown in FIG. 9A, for example, the slots 804 are offset from a longitudinal axis of the super-element assembly. Slot offset values vary from the feed to the load end, following a logarithmic curve with staggered or opposing slot positions relative to the waveguide center line for each unit cell.

Figure 10:
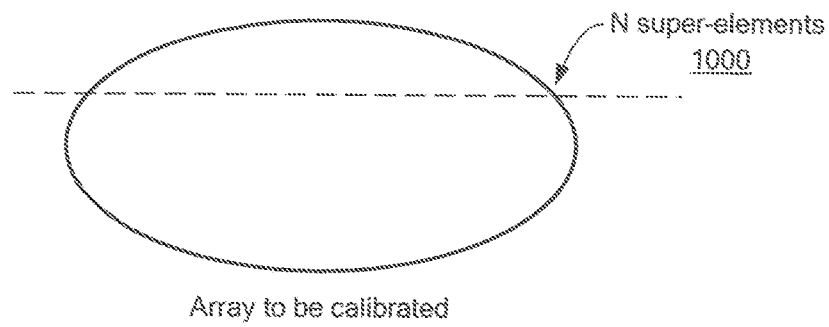
FIG. 10 is a schematic representation of a Fourier Gauge calibration system for an array.
Figure 10A:
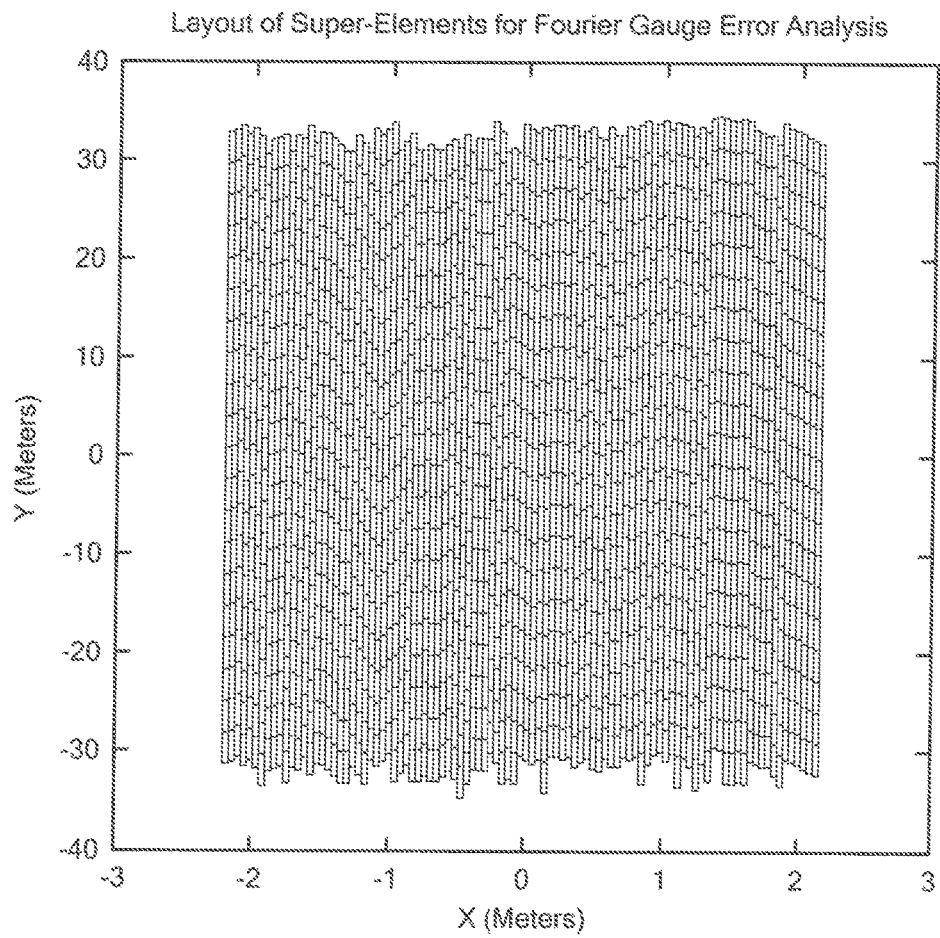
FIGS. 10A and 10B are schematic representations of a layout of super-elements for Fourier Gauge analysis.
Figure 10B:
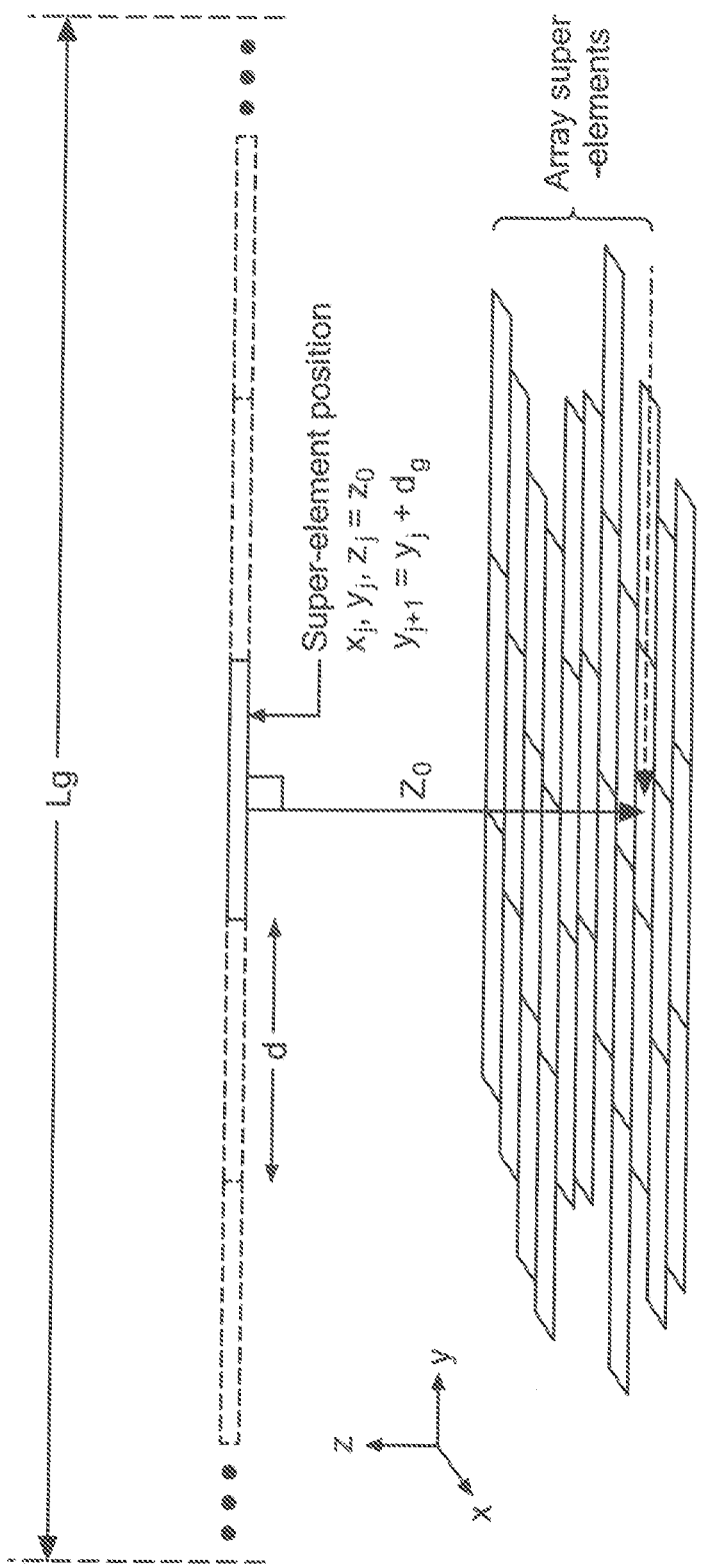

FIG. 10 shows a high level block diagram of array calibration using the MFG. FIGS. 10A,B show illustrative schematic representations of a layout of super-elements for the Mobile Fourier Gauge analysis. A series of N super-elements 1000 are aligned end-to-end to form a length Lg. The length of super-elements 1000 are located above the array to be calibrated. In one embodiment, the super-elements 1000 have the same structure as the super-elements in the arrays. In another embodiment, the super-element has a different taper of slots than those of the array, resulting in a uniform amplitude distribution in the Fourier Gauge super-element 1000. The positioning of the super-elements 1000 can be achieved using optical alignment. Note that in one embodiment of the MFG, the N MFG super-elements 1000 are realized by moving a single super-element along the y axis, stopping at positions j=1 through N, and making calibration measurements at each position. This achieves a "virtual" column of super-elements 1000.

Assuming uniform illumination, the response to an incident plane wave having $k=(2\pi/\lambda)\sin\theta$, where $k_0=(2\pi/\lambda)\sin\theta_0$, $\sin\theta_0(f)$ are defined by the super-element, $$Vout = \frac{\sin(k-k_0)M_d/2}{\sin(k-k_0)d/2} \frac{\sin(k-k_0)ND/2}{\sin(k-k_0)D/2}, \quad \text{Equation (1)}$$

where d is the slot spacing, $D=d_g$ is the super-element length $\approx Md$, $N\sim55$, and $M\sim50$, and k is the wave vector component magnitude in the direction of the Fourier Gauge, and $\lambda$ is the wavelength.

Equation (1) shows that the virtual column of the Fourier Gauge super-elements of length L=ND is tuned to preferentially measure the k component of the array that is matched to $k_0$; the width of this response is approximately $\Delta k = k - k_0 \sim \pi/L$, or $\Delta \sin(\theta) \sim \lambda/(2L)$. Thus, the Fourier Gauge measures the response of every element or super-element in the array at the desired wavevector, or equivalently, at the desired steering angle θ in the direction of the Fourier Gauge column. By phase aligning all super-element phase controls to maximize their vector sum as measured by the Fourier Gauge, one can effectively align the array to the desired steering angle. Similarly, by appropriately adjusting all super-element amplitude controls to yield the desired amplitude taper as measured by the Fourier Gauge, one can set the super-element amplitudes to yield the desired array illumination function.

Figures 11A, 11B:
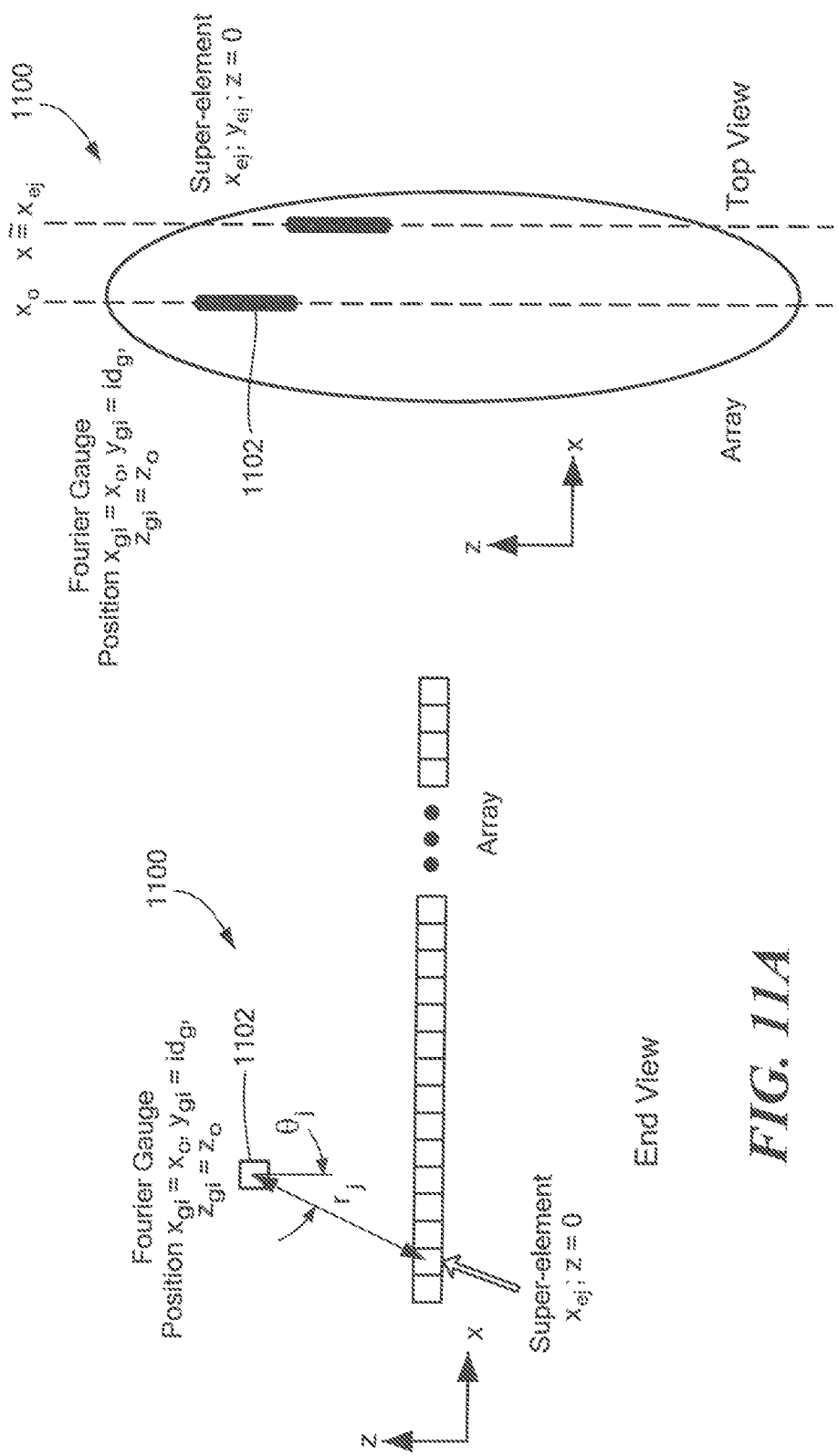
FIG. 11A is a schematic end view of a calibrator positioned above an array.
FIG. 11B is a schematic top view of a calibrator positioned above an array.

FIGS. 11A and 11B shows a high level virtual calibration system 1100. As shown in the end view of FIG. 11A, an x-axis extends left and right looking at the page and a z-axis extends up and down. As shown in the top view of FIG. 11B, the x-axis extends left and right looking at the page and the y-axis extends up and down. In one particular embodiment, a calibrator 1102 comprises one super-element that moves in steps in relation to the array to provide virtual calibration. In the illustrated embodiment, the calibrator 1102 moves above the array along the y-axis so that the position on the x-axis and the z-axis do not change as the calibrator moves from one end of the array to the other.

It is understood that the error of this calibration will be determined by the unknown error in position of the Fourier Gauge at every location that it stops and makes a measurement, and the error of the instrumentation in rf measurements. The net phase error due to the position error is approximately $\Delta\varphi \sim \Delta x * 2\pi/\lambda$. This phase error would be rms averaged with the instrumentation error to get the net calibration errors. At S-band frequencies, with positional accuracies $\Delta x$ of approximately 1 mm, phase errors would result of roughly 4° rms. Instrumentation errors would be lower.

FIG. 11A shows the calibrator super-element 1102 having a position $x_{gi}=x_0$, $y_{gi}=id_g$, and $z_{gi}=z_0$. The calibrator 1102 moves in steps of length $d_g$ along the y-axis. At the ith step, the y-axis position of the calibrator will be $id_g$. The position on the x-axis and the z-axis do not change as the calibrator 1102 moves along the y-axis.

The position of the calibrator 1102 is also defined in relation to each of the super-elements in the array. In one embodiment, the coordinates are defined by $r_j$, $\theta_j$ for the calibrator 1102 in relation to a super-element at coordinates $x_{ej}$, $y_{ej}$, 0. Since the array is located the plane of the z-axis, the z coordinate for the super-elements is zero.

As the calibrator moves in steps of i over N positions spaced by dg, a vector sum of voltages is computed with appropriate corrections for measured position, as follows:

$$V_{Tj} = \sum_{i=1,N} \exp[j\Delta\phi_{ij} + jk_y id_g]C_{ij}V_j = V_{Taylor}(x_{ej}, y_{ej})\exp(-jk_r r_j)/r_j^{1/2}E_{se}^2(\theta)$$

where $\Delta\varphi_{ij}=k_r [\Delta x_i(x_0-x_{ej})/r_j+\Delta z_i z_o/r_j]+k_y\Delta y_i$ $E_{se}(\theta)$ is the transverse radiation pattern of super-element, calibrator, and $C_{ij}$ is the measured coupling coefficient between super-element j and calibrator at position i $r_j=[(x_{ej}-x_o)^2+z_o^2]^{1/2}$ $k_y=2\pi \sin(\beta(f))/\lambda$ $k_r=[k_o^2-k_y^2]^{1/2}$ where $\beta(f)$=desired steering angle $\theta$ in direction of Fourier Gauge column at frequency f, $k_y$=component of k vector in direction of Fourier Gauge column, and $(\Delta x_i, \Delta y_i, \Delta z_i,)$=vector position error of Fourier Gauge super-element at location i.

The above prescribes how to adjust the phase and amplitude of each element j; both are adjusted so that the equation is satisfied for each element.

The above specifies $V_j$ for all array super-elements. It is understood that any practical number of calibrators can be used. Multiple calibrators can be used to compare results and assure reliable calibration. In the example used here to verify the accuracy of Satellite Calibration, the MFG is used for convenience only.

As the calibrator of length $d_g$ moves in steps of $d_g$ along y axis, the error in position i of the calibrator=$(\Delta x_i, \Delta y_i, \Delta z_i)$. This position error results in a phase error in the Fourier Gauge measurements at position i, which contributes to the calibration error budget, as discussed above.

Figure 12A:
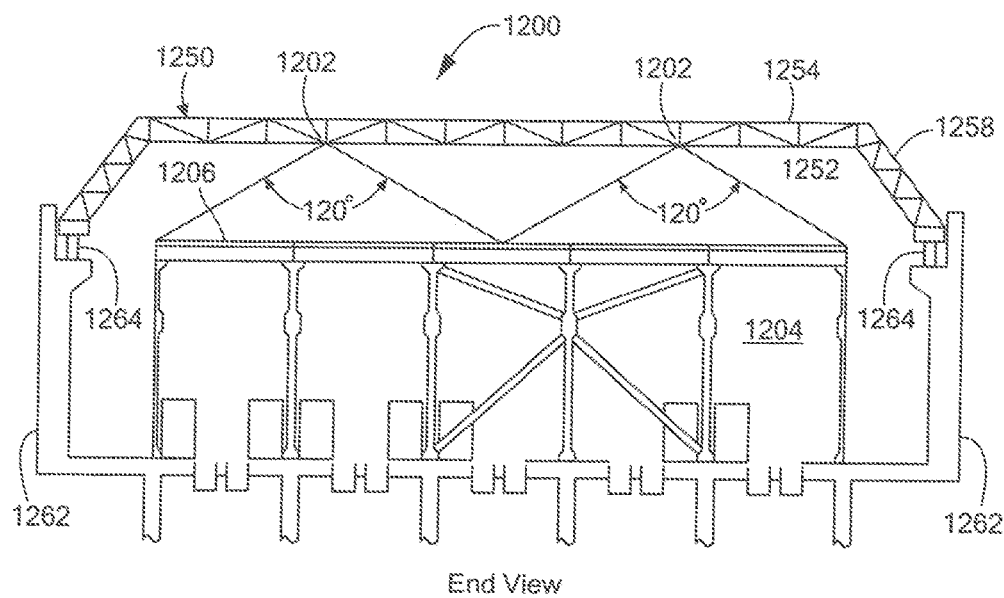
FIG. 12A is a schematic end view of a calibration system and array.
Figure 12B:
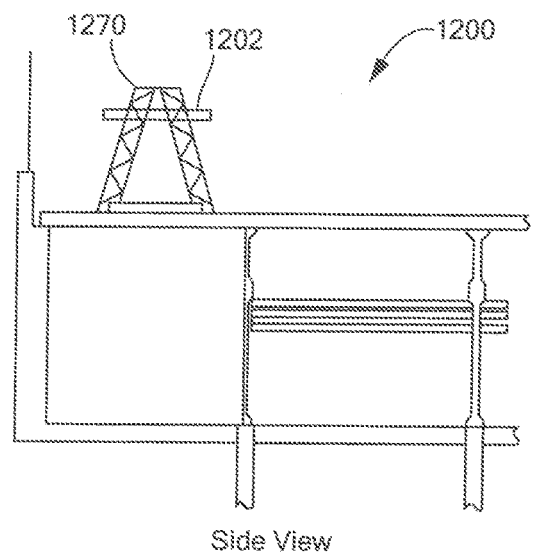
FIG. 12B is a schematic side view of a calibration system and array.
Figure 12C:
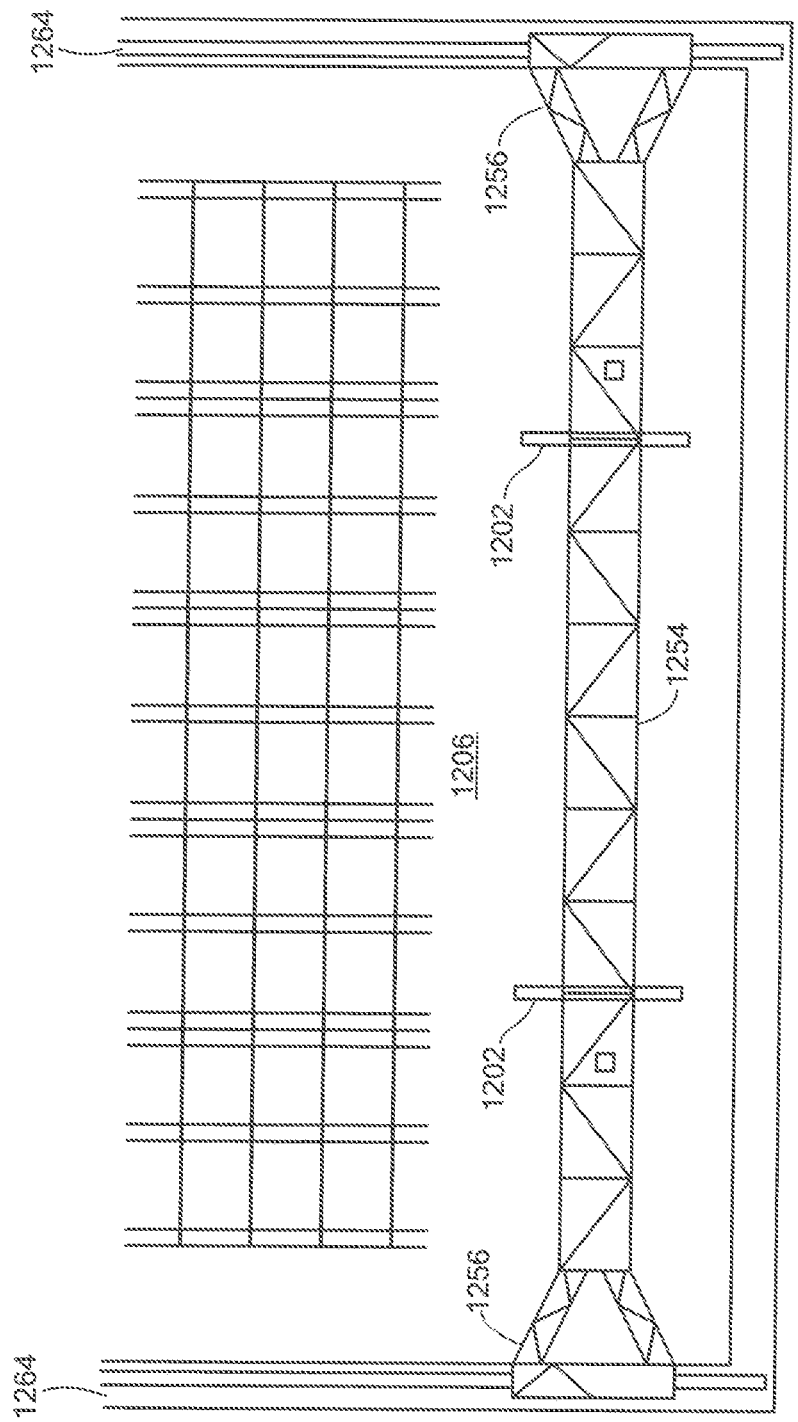
FIG. 12C is a schematic top view of a calibration system and array.
Figure 12D:
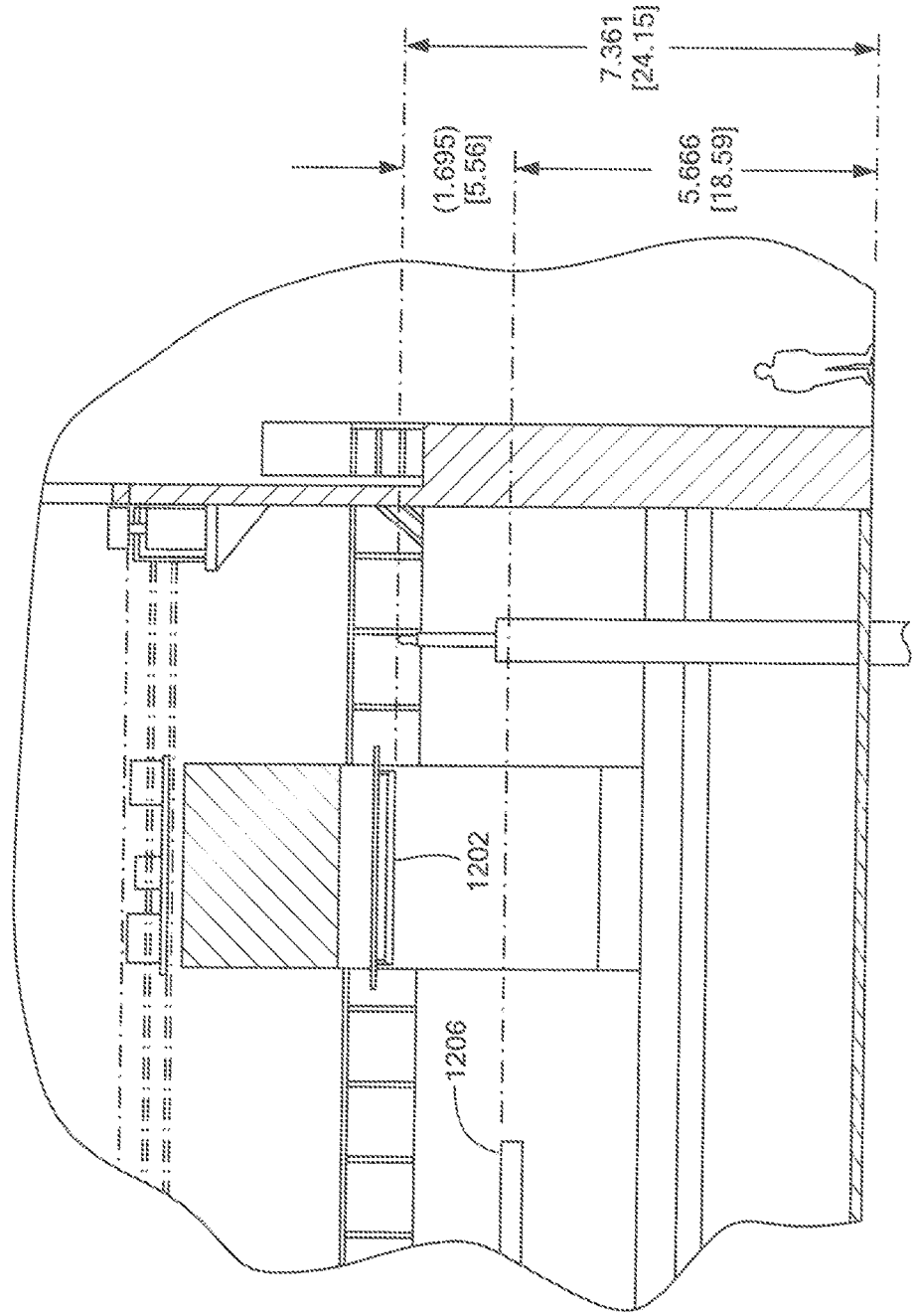
FIG. 12D is a schematic partial view of a calibration system and array.

FIGS. 12A (end view), 12B (side view), 12C (partial top view), and 12D (partial side view with exemplary dimensions) show an exemplary system 1200 for positioning a calibrator 1202 in relation to a large array. A support structure 1204 supports the array elements 1206, such as super-elements, forming the array. In general, the support structure 1204 should support the array elements while allowing operator access to the array components.

A calibration system 1250 includes a mechanism to manipulate the calibrator to obtain information for calibrating the array. In an exemplary embodiment, the calibration system 1250 includes a crane 1252 that span across a width of the array. The crane 1252 includes a main member 1254 with respective connecting members 1256, 1258, which are supported by beams 1260, 1262 on each side of the array. Rail members 1264 on the beams allow the crane to move in a controlled manner. The crane 1252 moves along a length of the array to position the calibrator 1202 during the calibration process under the control of a calibration module 1270 that controls the Fourier Gauge calibration process and processes the information received at the calibrator 1202.

Figure 13:
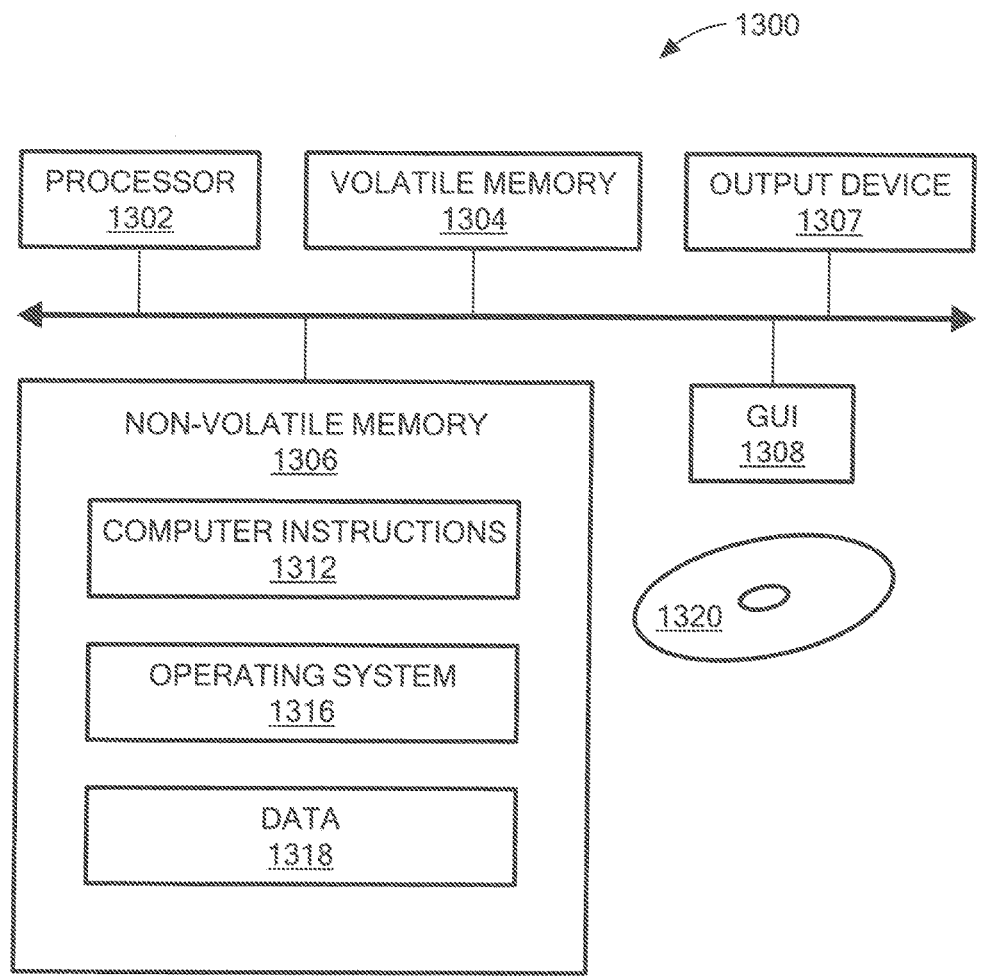
FIG. 13 is a schematic representation of an illustrative computer that can perform at least a portion of the processing described herein.

FIG. 13 shows an exemplary computer 1300 that can perform at least part of the processing described herein. The computer 1300 includes a processor 1302, a volatile memory 1304, a non-volatile memory 1306 (e.g., hard disk), an output device 1307 and a graphical user interface (GUI) 1308 (e.g., a mouse, a keyboard, a display, for example). The non-volatile memory 1306 stores computer instructions 1312, an operating system 1316 and data 1318. In one example, the computer instructions 1312 are executed by the processor 1302 out of volatile memory 1304. In one embodiment, an article 1320 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method for subarray element level calibration, comprising:
    illuminating a satellite having a known position at a first time with a first signal using a transmit array of a phased array radar system;
    receiving signal return from the satellite at a receive array of the radar system, wherein the receive array has subarrays and a first one of elements in respective subarrays are active;
    determining, using a computer processor of the radar system, a first plane front for the signal return associated with the first time;
    illuminating the satellite at a second time with a second signal using the transmit array;
    receiving signal return associated with the second time from the satellite at the receive array, wherein a second one of elements in the respective arrays are active;
    determining, using the computer processor, a second plane front for the signal return associated with the second time;
    compensating for movement of the satellite between the first and second times;
    calibrating the first ones of elements in the subarrays in relation to the second ones of elements in the subarrays using the first and second plane fronts; and
    repeating until elements in the subarrays are calibrated with respect to each other.

2. The method according to claim 1, further including measuring change in insertion phase and phase slope for the signal returns for the first and second times.

3. The method according to claim 1, further including adjusting amplitude gain to compensate for the satellite movement.

4. The method according to claim 1, further including using a second satellite for calibration for the subarray element calibration.

5. The method according to claim 1, further including verifying the calibration using a Fourier Gauge system.

6. The method according to claim 1, wherein at least one of the subarrays includes eight elements.

7. The method according to claim 1, further including using a set of reference elements in the subarrays to measure changes in insertion phase and phase slope from pulse to pulse.

8. The method according to claim 7, further including calibrating elements in the set of reference elements.

9. An article, comprising:
    a non-transitory storage medium having stored instructions that enable a machine to perform subarray element level calibration, the instructions to:
    illuminate a satellite having a known position at a first time with a first signal using a transmit array of a phased array radar system;
    receive signal return from the satellite at a receive array of the radar system, wherein the receive array has subarrays and a first one of elements in respective subarrays are active;
    determine, using a computer processor of the radar system, a first plane front for the signal return associated with the first time;
    illuminate the satellite at a second time with a second signal using the transmit array;
    receive signal return associated with the second time from the satellite at the receive array, wherein a second one of elements in the respective arrays are active;
    determine, using the computer processor, a second plane front for the signal return associated with the second time;
    compensate for movement of the satellite between the first and second times;
    calibrate the first ones of elements in the subarrays in relation to the second ones of elements in the subarrays using the first and second plane fronts; and
    repeat until elements in the subarrays are calibrated with respect to each other.

10. The article according to claim 9, further including instructions to measure change in insertion phase and phase slope for the signal returns for the first and second times.

11. The article according to claim 9, further including instructions to adjust amplitude gain to compensate for the satellite movement.

12. The article according to claim 9, further including instructions to use a second satellite for calibration for the subarray element calibration.

13. The article according to claim 9, further including instructions to verify the calibration using a Fourier Gauge system.

14. The article according to claim 9, wherein at least one of the subarrays includes eight elements.

15. The article according to claim 9, further including instructions to use a set of reference elements in the subarrays to measure changes in insertion phase and phase slope from pulse to pulse.

16. The article according to claim 15, further including instructions to calibrate elements in the set of reference elements.

17. A method for subarray level calibration, comprising:
    illuminating a satellite having a known position at a first time with a signal using a transmit array of a phased array radar system;
    receiving signal return from the satellite at a receive array of the radar system, wherein the receive array has subarrays and selected elements of the subarrays are activated as reference elements;
    measuring the signal return at the reference elements;

determining, using a computer processor of the radar system, a first plane front for the signal return associated with the first time;

comparing the first plane front to an expected plane front based on the known satellite position; and determining, using the computer processor, calibration of the subarrays relative to each other from the comparing of the first plane front to the expected plane front.

18. The method according to claim 17, further including using a second satellite for further calibration at the subarray level.

19. The method according to claim 17, further including achieving at least six degree, 1.0 dB rms calibration accuracy in a single pass of the satellite.

20. An article, comprising:

a non-transitory storage medium having stored instructions that enable a machine to perform subarray level calibration, the instructions to:

illuminate a satellite having a known position at a first time with a signal using a transmit array of a phased radar system;

receiving signal return from the satellite at a receive array of the radar system, wherein the receive array has subarrays and selected elements of the subarrays are activated as reference elements;

measure the signal return at the reference elements;

determine, using a computer processor of the radar system, a first plane front for the signal return associated with the first time;

compare the first plane front to an expected plane front based on the known satellite position; and determine, using the computer processor, calibration of the subarrays relative to each other from the comparing of the first plane front to the expected plane front.

\* \* \* \* \*